United States Patent
Yamauchi et al.

(10) Patent No.: US 8,584,137 B2
(45) Date of Patent: Nov. 12, 2013

(54) IMAGE PROCESSING SYSTEM FOR JUDGING WHETHER A PARTIAL JOB SHOULD BE PROCESSED BY AN OWN DEVICE OR ANOTHER DEVICE

(75) Inventors: Yasuhiro Yamauchi, Toyohashi (JP); Taisuke Akahori, Takatsuki (JP); Kazuhiro Tomiyasu, Toyokawa (JP); Eiichi Yoshida, Toyokawa (JP); Tomoko Maruyama, Toyokawa (JP); Kenichi Sawada, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1214 days.

(21) Appl. No.: 12/019,989

(22) Filed: Jan. 25, 2008

(65) Prior Publication Data
US 2008/0184236 A1 Jul. 31, 2008

(30) Foreign Application Priority Data
Jan. 29, 2007 (JP) ................. 2007-018429

(51) Int. Cl.
*G06F 9/46* (2006.01)
*G06F 13/00* (2006.01)

(52) U.S. Cl.
USPC .......................................... 718/106; 719/312

(58) Field of Classification Search
USPC ................... 718/100, 106; 719/312
See application file for complete search history.

(56) References Cited

U.S. PATENT DOCUMENTS

| | | | |
|---|---|---|---|
| 2002/0041392 A1 | 4/2002 | Tokura | |
| 2002/0101604 A1 * | 8/2002 | Mima et al. .................. | 358/1.15 |
| 2005/0120354 A1 * | 6/2005 | Sunada et al. ................ | 719/310 |
| 2005/0177549 A1 * | 8/2005 | Hornick ........................ | 707/1 |
| 2006/0092462 A1 | 5/2006 | Mokuya | |
| 2006/0130063 A1 * | 6/2006 | Kilian et al. ................. | 718/100 |
| 2006/0212149 A1 * | 9/2006 | Hicken et al. ................ | 700/94 |
| 2007/0133781 A1 * | 6/2007 | Febonio et al. .......... | 379/265.05 |

FOREIGN PATENT DOCUMENTS

| | | |
|---|---|---|
| JP | 10-021021 | 1/1998 |
| JP | 2001-034428 A | 2/2001 |
| JP | 2002-268850 A | 9/2002 |
| JP | 2006-011694 | 1/2006 |
| JP | 2006-145630 A | 6/2006 |
| JP | 2006-261949 | 9/2006 |
| JP | 2007-011694 | 1/2007 |

OTHER PUBLICATIONS

Decision of Patent in JP 2007-018429 dated Dec. 16, 2008, and an English Translation thereof.

* cited by examiner

*Primary Examiner* — Meng An
*Assistant Examiner* — Blake Kumabe
(74) *Attorney, Agent, or Firm* — Buchanan Ingersoll & Rooney PC

(57) ABSTRACT

An image processing system including: storage; image processing devices; and job divider dividing an unprocessed job into partial jobs and store them into storage. Each image processing device includes: a first judging part to judge whether partial job stored in the storage can be processed by own device; a transmitter to, if the judgment result is positive, transmit and store first information indicating condition for processing the partial job, to the storage; an obtaining part to obtain second information indicating condition with which another image processing device processes the partial job, from the storage; a second judging part to judge whether own device should process the partial job, in accordance with standard common to the image processing devices, referring to first and second information; and job processor to process the partial job if second judging part judges positively.

27 Claims, 31 Drawing Sheets

FIG.9

| Job0001 |||||
|---|---|---|---|---|
| Document data |||||
| Process condition (property) |||||
| Print condition || FAX transmission condition ||
| Color | Color | Document size | A4 |
| Document size | A4 | Transmission standard | G3 |
| Output size | Same as document size | Resolution | 600dpi |
| Number of prints | 1 | F code | Yes |
| Page allocation | 2 in 1 | | |
| Single/both side printing | Both side | | |
| Staple | Yes | | |

FIG.10

| | | Job0001-1 | Job0001-2 | Job0002-1 | Job0002-2 | Job-xxxx |
|---|---|---|---|---|---|---|
| MFP entry | MFP-1 | ○ | | | | |
| | MFP-2 | | ○ | | | |
| | MFP-3 | ○ | | | ○ | |
| | MFP-4 | | | ○ | ○ | |
| | MFP-n | | | | ○ | ○ |
| Job process condition | Color print | ○ | | ○ | | ○ |
| | Monochrome print | | | | | ○ |
| | Nin1 print | ○ | | | | ○ |
| | Both side print | ○ | | ○ | | ○ |
| | FAX | | ○ | | ○ | ○ |
| | Punch | | | | ○ | ○ |
| | Staple | ○ | | ○ | ○ | ○ |

FIG.11A

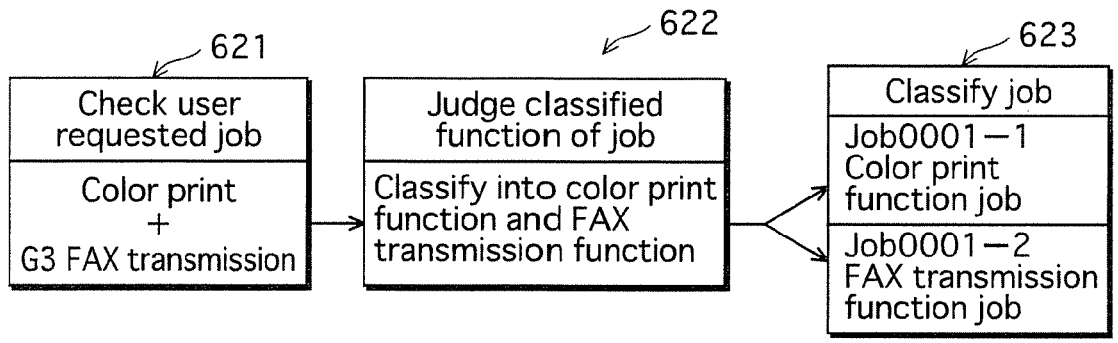

| Classified function item | User requested job item |
|---|---|
| Monochrome print function | Monochrome print |
| | Monochrome + woven pattern print |
| | . . . |
| Color print function | Color print |
| | Color + woven pattern print |
| | . . . |
| Scan transmission function | E-Mail transmission |
| | SMB transmission |
| | FTP transmission |
| | . . . |
| FAX transmission function | G3 FAX transmission |
| | G4 FAX transmission |
| | Internet FAX transmission |
| | . . . |
| . . . | . . . |
| | . . . |

FIG.12A

```
⟨Job ID⟩ 0001 ⟨/Job ID⟩
⟨Function⟩
        ⟨Function 1⟩ Color Print ⟨/Function 1⟩
        ⟨Parameter 1⟩
            ⟨Parameter 11⟩ A4 ⟨/Parameter 11⟩
            ⟨Parameter 12⟩ 1 ⟨/Parameter 12⟩
            ⟨Parameter 13⟩ 2 in1 ⟨/Parameter 13⟩
            . . .
        ⟨/Parameter 1⟩                                    }631
        ⟨Function 2⟩ Fax Transmission ⟨/Function 2⟩
        ⟨Parameter 2⟩
            ⟨Parameter 21⟩ A4 ⟨/Parameter 21⟩
            ⟨Parameter 22⟩ 400dpi ⟨/Parameter 22⟩
            ⟨Parameter 23⟩ G3 ⟨/Parameter 23⟩
            . . .
        ⟨/Parameter 2⟩                                    }632

⟨/Function⟩
```

FIG.12B

```
⟨Job ID⟩ 0001-1 ⟨/Job ID⟩
⟨Function⟩
        ⟨Function 1⟩ Color Print ⟨/Function 1⟩
        ⟨Parameter 1⟩
            ⟨Parameter 11⟩ A4 ⟨/Parameter 11⟩
            ⟨Parameter 12⟩ 1 ⟨/Parameter 12 ⟩
            ⟨Parameter 13⟩ 2in1 ⟨/Parameter 13⟩
            . . .
        ⟨/Parameter 1⟩
⟨/Function⟩                                               }633
```

FIG.12C

```
⟨Job ID⟩ 0001-2 ⟨/Job ID⟩
⟨Function⟩
        ⟨Function 2⟩ Fax Transmission ⟨/Function 2⟩
        ⟨Parameter 2⟩
            ⟨Parameter 21⟩ A4 ⟨/Parameter 21⟩
            ⟨Parameter 22⟩ 400dpi ⟨/Parameter 22⟩
            ⟨Parameter 23⟩ G3 ⟨/Parameter 23 ⟩
            . . .
        ⟨/Parameter 2⟩                                    }634
⟨/Function⟩
```

FIG.15

MFP-1: Function information (color machine)

| | | | |
|---|---|---|---|
| Basic | Document read size MAX×A4 | | |
| | Output size MAX×A4 | | |
| Copy function | Single-both side | N in 1 | Density adjustment |
| | Magnification rate change | Document type selection | Color adjustment |
| Print function | Single-both side | N in 1 | Image quality adjustment |
| | Magnification/ reduction | Stamp print | Overlay print |
| Scan function | Single-both side | Density adjustment | Resolution change |
| | ~~PDF/TIFF conversion~~ | ~~Scan to E-Mail~~ | ~~Scan to HDD~~ |
| FAX function | G3/G4 | F code available | Max 600dpi | Timer transmission | ~~ADF~~ |
| Option | ~~HDD:40GB~~ | ~~Punch~~ | | Staple |

MFP-2: Function information (monochrome machine)

| | | | |
|---|---|---|---|
| Basic | Document read size MAX×A3 | | |
| | Output size MAX×A3 | | |
| Copy function | Single-both side | N in 1 | Density adjustment |
| | Magnification rate change | Document type selection | ~~Color adjustment~~ |
| Print function | Single-both side | N in 1 | Image quality adjustment |
| | Magnification/ reduction | Stamp print | Overlay print |
| Scan function | Single-both side | Density adjustment | Resolution change |
| | PDF/TIFF conversion | Scan to E-Mail | Scan to HDD |
| FAX function | ~~Single-both side~~ | ~~Density adjustment~~ | ~~Resolution change~~ | ~~Timer transmission~~ | ~~ADF~~ |
| Option | ~~HDD:40GB~~ | ~~Punch~~ | | ~~Staple~~ |

MFP-3: Function information (color machine)

| | | | |
|---|---|---|---|
| Basic | Document read size MAX×A3 | | |
| | Output size MAX×A3 | | |
| Copy function | Single-both side | N in 1 | Density adjustment |
| | Magnification rate change | Document type selection | Color adjustment |
| Print function | Single-both side | N in 1 | Image quality adjustment |
| | Magnification/ reduction | Stamp print | Overlay print |
| Scan function | Single-both side | Density adjustment | Resolution change |
| | PDF/TIFF conversion | Scan to E-Mail | Scan to HDD |
| FAX function | G3 | F code available | Max 400dpi | Timer transmission | ADF |
| Option | HDD:40GB | Punch | | Staple |

FIG. 16A

MFP-1 entry file

<entry file example: productivity oriented>

| Job0001-1.mfp1 | |
|---|---|
| System speed | 45ppm |
| Current status | In warmup |
| Paper in tray | Recycled paper |
| Toner residual amount | Full |
| Use frequency | Low |
| Power consumption | Low |

FIG. 16B

<entry file example: cost oriented>

| Job0001-1.mfp1 | |
|---|---|
| Power consumption | Low |
| Use frequency | Low |
| Toner residual amount | Full |
| Paper in tray | Recycled paper |
| Current status | In warmup |
| System speed | 45ppm |

MFP-3 entry file

| Job0001-1.mfp3 | |
|---|---|
| System speed | 45ppm |
| Current status | In wait |
| Paper in tray | Genuine paper |
| Toner residual amount | Near empty |
| Use frequency | High |
| Power consumption | High |

Priority: High ⇔ Low

FIG.19

MFP-1 entry file

| Job0001-2.mfp1 | |
|---|---|
| Support standard | G3/G4 |
| Resolution | 600dpi |
| Communication speed | High speed |
| Use frequency | High |
| Power consumption | High |

MFP-3 entry file

| Job0001-2.mfp3 | |
|---|---|
| Support standard | G3 |
| Resolution | 400dpi |
| Communication speed | Normal |
| Use frequency | Low |
| Power consumption | Low |

FIG. 28A  ⟨Example of competing entry files⟩

Priority: High ←→ Low

| Job0001-1.mfp1 | |
|---|---|
| System speed | 45ppm |
| Current status | In wait |
| Paper in tray | Recycled paper |
| Toner residual amount | Full |
| Use frequency | Low |
| Power consumption | Low |

| Job0001-1.mfp3 | |
|---|---|
| System speed | 45ppm |
| Current status | In wait |
| Paper in tray | Recycled paper |
| Toner residual amount | Full |
| Use frequency | Low |
| Power consumption | Low |

Equal conditions ⇒ Add another information to entry file

FIG. 28B

| Job0001-1.mfp1 | |
|---|---|
| System speed | 45ppm |
| Current status | In wait |
| Paper in tray | Recycled paper |
| Toner residual amount | Full |
| Use frequency | Low |
| Power consumption | Low |
| Paper residual amount | Full |
| Security setting | Enhanced mode:ON |
| Installation location | Corner of office (far) |

| Job0001-1.mfp3 | |
|---|---|
| System speed | 45ppm |
| Current status | In wait |
| Paper in tray | Recycled paper |
| Toner residual amount | Full |
| Use frequency | Low |
| Power consumption | Low |
| Paper residual amount | Full |
| Security setting | Enhanced mode:OFF |
| Installation location | Center of office (near) |

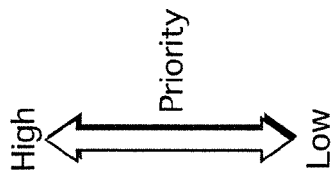

FIG. 31A

<entry file example: productivity oriented>

| Job0001-1.mfp1 | |
|---|---|
| System speed | 45ppm |
| Current status | In warmup |
| Own device received | NO |
| Paper in tray | Recycled paper |
| Toner residual amount | Full |
| Use frequency | Low |
| Power consumption | Low |

| Job0001-1.mfp3 | |
|---|---|
| System speed | 45ppm |
| Current status | In wait |
| Own device received | YES |
| Paper in tray | Genuine paper |
| Toner residual amount | Near empty |
| Use frequency | High |
| Power consumption | High |

FIG. 31B

<entry file example: cost oriented>

| Job0001-1.mfp1 | |
|---|---|
| Power consumption | Low |
| Own device received | NO |
| Use frequency | Low |
| Toner residual amount | Full |
| Paper in tray | Recycled paper |
| Current status | In warmup |
| System speed | 45ppm |

IMAGE PROCESSING SYSTEM FOR JUDGING WHETHER A PARTIAL JOB SHOULD BE PROCESSED BY AN OWN DEVICE OR ANOTHER DEVICE

This application is based on application No. 2007-18429 filed in Japan, the contents of which are hereby incorporated by reference.

BACKGROUND OF THE INVENTION (1) Field of the Invention

The present invention relates to an image processing system including a plurality of image processing devices, an image processing device, a job processing method, and a recording medium.

(2) Description of the Related Art

Currently prevalent is image processing systems in which a plurality of client terminals, a plurality of image processing devices, and a job management server are connected with each other via a network such as a LAN, and each client terminal is able to cause each image processing device to execute a job via the job management server.

In some of such image processing systems, when the job management server receives a request for processing a job from a client terminal, the job management server accesses a plurality of copiers in sequence to obtain (a) information indicating image processing functions that can be executed by them and (b) information indicating the current status of the copiers, namely whether they are in wait, whether they are executing a job, the residual amount of paper and the like, and then selects the most suitable copier to execute the job, by referring to these information, and causes the selected copier to execute the job (see Japanese Patent Application Publication No. 2001-34428).

The above-described image processing system requires a server having a function to select a copier that executes a job. In general, such a server is expensive, and imposes a burden of high cost to the user.

Also, in recent years, the user can specify a plurality of desired functions, for example, a function to copy a document image and a function to transmit the same document image by facsimile, by one operation.

When such a job specifying a plurality of functions is entered, the job management server selects a copier, among the system, that can execute the job. However, if the system has a few copiers that can execute all the specified functions, each time a job specifying the functions is entered, the server always selects any of the few copiers.

The selected copier takes a longer time to complete a job if the job specifies a larger number of functions. This may delay the start of the next job, and increase the job wait time.

SUMMARY OF THE INVENTION

The object of the present invention is therefore to provide an image processing system, an image processing device, a job processing method, and a recording medium that achieve smooth job processing and reduced cost in a structure including a plurality of image processing devices.

The above object is fulfilled by an image processing system comprising: a storage; a plurality of image processing devices; and a job divider operable to divide an unprocessed job into a plurality of partial jobs that can be processed separately, and store the partial jobs into the storage, wherein each of the plurality of image processing devices includes: a first judging part operable to judge whether one of the plurality of partial jobs stored in the storage can be processed by an own device; a transmitter operable to, if the first judging part judges that the one of the plurality of partial jobs can be processed by the own device, transmit first information, which indicates a condition with which the own device processes the partial job, to the storage and cause the storage to store the first information; an obtaining part operable to obtain second information, which indicates a condition with which another one of the plurality of image processing devices processes the partial job, from the storage; a second judging part operable to judge whether the own device should process the partial job, in accordance with a standard that is common to the plurality of image processing devices, by referring to the first information and the second information; and a job processor operable to process the partial job if the second judging part judges that the own device should process the partial job.

In the above-stated structure in which an unprocessed job is divided into a plurality of partial jobs, and each of a plurality of image processing devices judges, for each of the partial jobs, whether the own device can process a partial job, stores into the storage unit the first information indicating a condition with which the own device processes the partial job, obtains the second information indicating a condition with which another image processing device processes the partial job, and judges whether the own device should process the partial job, in accordance with a standard that is common to the plurality of image processing devices, by referring to the first information and the second information. The stated structure reduces the cost since the image processing system does not require a server as in conventional technologies. Also, this structure enables partial jobs to be processed by different image processing devices, enabling a job processing to be performed by a plurality of image processing devices in distribution, preventing processes from concentrating onto one device, thus realizing smooth job processing.

The above object is also fulfilled by an image processing device for use as one of a plurality of image processing devices included in an image processing system that further includes a storage, the image processing device comprising: a first judging part operable to, if an unprocessed job has been divided into a plurality of partial jobs that can be processed separately, and the partial jobs are stored in the storage, judge whether one of the plurality of partial jobs stored in the storage can be processed by an own device; a transmitter operable to, if the first judging part judges that the one of the plurality of partial jobs can be processed by the own device, transmit first information, which indicates a condition with which the own device processes the partial job, to the storage and cause the storage to store the first information; an obtaining part operable to obtain second information, which indicates a condition with which another one of the plurality of image processing devices processes the partial job, from the storage; a second judging part operable to judge whether the own device should process the partial job, in accordance with a standard that is common to the plurality of image processing devices, by referring to the first information and the second information; and a job processor operable to process the partial job if the second judging part judges that the own device should process the partial job.

The above object is also fulfilled by an image processing method for use in an image processing system that includes a storage and a plurality of image processing devices, the image processing method executing a first step of dividing an unprocessed job into a plurality of partial jobs that can be processed separately and storing the partial jobs into the storage, wherein after the execution of the first step, each of the plurality of image processing devices executes: a second step of judging whether one of the plurality of partial jobs stored in the storage can be processed by an own device; a third step of, if the second step judges that the one of the plurality of partial jobs can be processed by the own device, transmitting first information, which indicates a condition with which the own device processes the partial job, to the storage and causing the storage to store the first information; a fourth step of obtaining second information, which indicates a condition with which another one of the plurality of image processing devices processes the partial job, from the storage; a fifth step of judging whether the own device should process the partial job, in accordance with a standard that is common to the plurality of image processing devices, by referring to the first information and the second information; and a six step of processing the partial job if the fifth step judges that the own device should process the partial job.

The above object is also fulfilled by a recording medium recording therein a program for causing a computer, which is included in one of a plurality of image processing devices constituting an image processing system that includes a storage as well, to execute: a, first process of judging whether one of the plurality of partial jobs stored in the storage can be processed by an own device; a second process of, if the first process judges that the one of the plurality of partial jobs can be processed by the own device, transmitting first information, which indicates a condition with which the own device processes the partial job, to the storage and causing the storage to store the first information; a third process of obtaining second information, which indicates a condition with which another one of the plurality of image processing devices processes the partial job, from the storage; a fourth process of judging whether the own device should process the partial job, in accordance with a standard that is common to the plurality of image processing devices, by referring to the first information and the second information; and a fifth process of processing the partial job if the fourth process judges that the own device should process the partial job.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 9 shows an example of job data;

FIG. 10 shows a job list that is created by the storage device;

FIG. 11A shows steps in the division process performed by the job dividing unit of the PC; FIG. 11B shows a classified function item table;

FIGS. 12A through 12C show specific examples of data structure of the process condition;

FIG. 15 shows the function information of each MFP;

FIGS. 16A and 16B show examples of entry files;

FIG. 19 shows examples of entry files for the job;

FIGS. 28A and 28B show examples of entry files in Embodiment 3;

FIGS. 31A and 31B show examples of entry files in a modification.

DESCRIPTION OF THE PREFERRED EMBODIMENT

The following describes preferred embodiments of an image processing system, image processing device, job processing method, and recording medium of the present invention, with reference to the attached drawings.

Embodiment 1

<Structure of Image Processing Device and Image Processing System>

Details, in structure, of the image processing device of the present embodiment and the image processing system including the image processing device will be provided in the following.

1. Image Processing System

Figure 1:
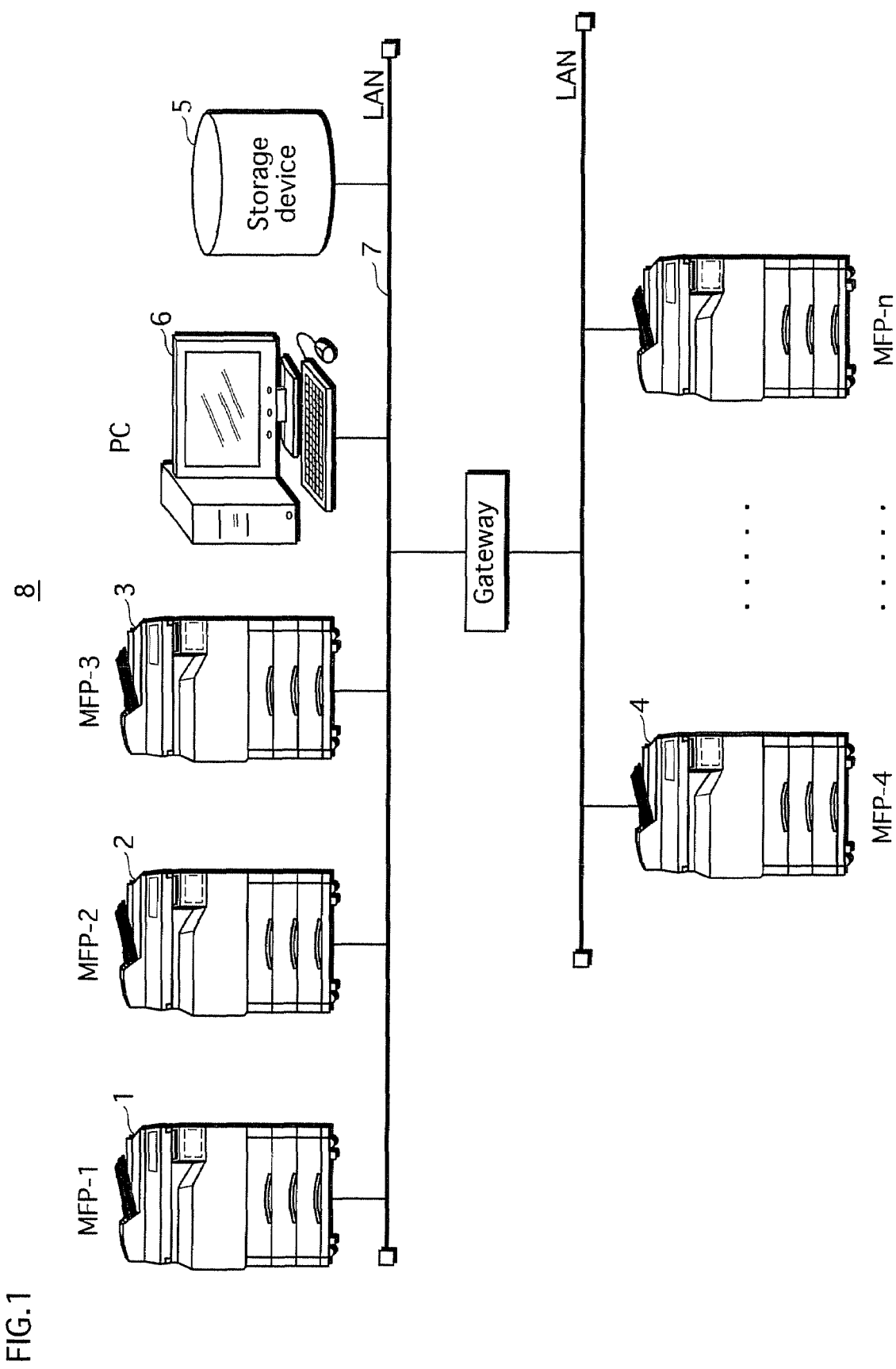
FIG. 1 schematically shows the overall structure of an image processing system in Embodiment 1.

FIG. 1 schematically shows the overall structure of an image processing system 8.

As shown in FIG. 1, the image processing system 8 includes MFPs (Multiple Function Peripherals) 1, 2, 3, 4, . . . n, a storage device 5, and a PC (Personal Computer) 5, which are connected with each other via a network 7 that is a LAN or the like. Each of the MFPs 1, 2, 3, 4, . . . n receives a request for processing a job, such as a scan, copy, print, or facsimile communication, from the user, and processes the job. The MFPs 1, 2, 3, 4, ... n will be described in detail later.

The storage device 5 is, for example, a NAS (Network Attached Storage) or HDD (Hard Disk Drive), and stores job data and entry files and the like, which will be described later.

The PC 6 is used by the user to create a document, send a request for processing a job such as a scan, copy, or print, and confirm the result of the job processing.

It should be noted here that the image processing system 8 may be connected with, for example, a FAX machine and a printer, as well as with the MFPs 1, 2, 3, 4, ... the storage device 5 and the PC 6.

2. Image Processing Device

The following describes structure and functions of the MFPs 1, 2, 3, 4, ... n, using the MFP 1 as an example thereof.

Figure 2:
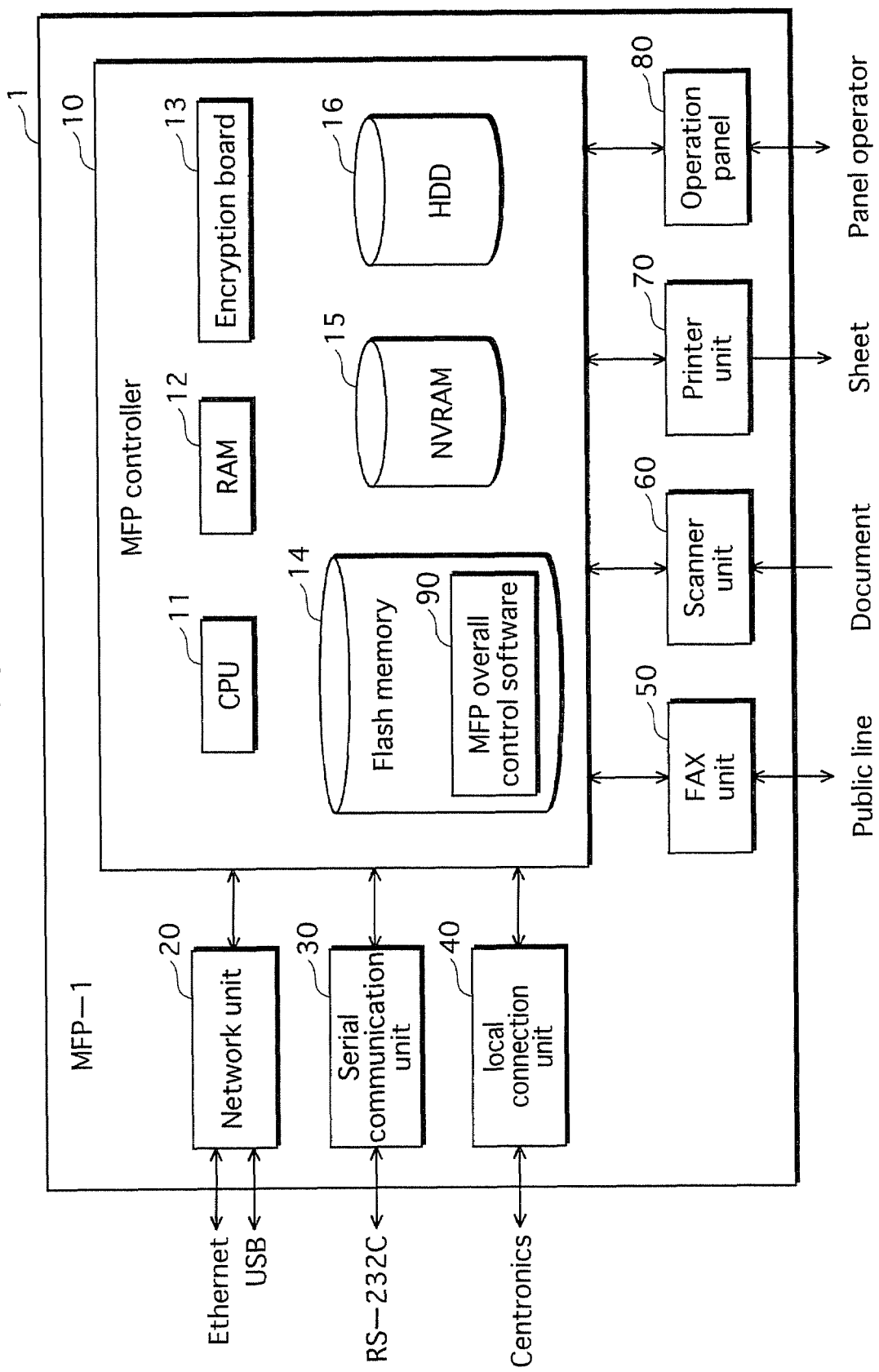
FIG. 2 is a block diagram showing a structural outline of an MFP included in the image processing system.

FIG. 2 is a block diagram showing a structural outline of the MFP 1.

As shown in FIG. 2, the MFP 1 includes an MFP controller 10, a network unit 20, a serial communication unit 30, a local connection unit 40, a FAX unit 50, a scanner unit 60, a printer unit 70, and an operation panel 80.

The MFP controller 10 controls the functions and operations of the MFP 1 as a whole, by controlling each of the above-mentioned units. This enables the MFP 1 to process the jobs such as the scan, copy, and print. The MFP controller 10 includes a CPU (Central Processing Unit) 11, a RAM (Random Access Memory) 12, an encryption board 13, a flash memory 14, an NVRAM (Non-Volatile Random Access Memory) 15, and an HDD 16.

The CPU 11 executes the object code written in the MFP overall control software 90 stored in the flash memory 14. The CPU 11 also subjects data, which is received from the network unit 20, the serial communication unit 30, the local connection unit 40, the FAX unit 50, the scanner unit 60, the HDD 16 or the like, into a calculation or a process and outputs the result thereof to the network unit 20, the serial communication unit 30, the local connection unit 40, the FAX unit 50, the printer unit 70, the HDD 16 or the like.

The RAM 12 has a role of a main memory that functions as a work memory used when the CPU 11 performs a calculation or a process on the data. The RAM 12 is a DRAM (Dynamic Random Access Memory), an SDRAM (Synchronous DRAM) or the like.

The encryption board 13 is loaded to achieve a security function of the MFP 1, and is an integrated circuit for encrypting data that is read or written from/onto the HDD 16.

The flash memory 14 stores the MFP overall control software 90 that is executed by the CPU 11. Also, the flash memory 14 stores messages that are written in various languages and are to be displayed on the operation panel 80. Further, the flash memory 14 stores an OS (Operating System), such as VxWORKS, for embedded device.

The NVRAM 15 is a nonvolatile memory, and stores various setting values that are necessary for the MFP 1 to operate. The setting values that can be stored therein include network setting values such as an IP address and image quality adjustment setting values.

The HDD 16 stores data in a file format. The HDD 16 is used as a swap area when data exceeding in size the capacity of the RAM 12 needs to be stored. It should be noted here that the HDD 16 may be provided with a password protection function (HDD lock function) that prohibits reading/writing if passwords do not match, as a security function of the MFP 1.

The network unit 20 includes an Ethernet™ port and a USB port. The Ethernet™ port is a port for connecting the MFP 1 to the network 7 in conformance with Ethernet™, and supports the standard 10BASE-T, 100BASE-T or the like. The USB port is a port for connecting the MFP 1 to the PC 6 locally. This connection enable the print function or the like to be used from the PC 6 or the like.

The serial communication unit 30 is provided with a serial port for connecting the MFP 1 to the PC 6 by the serial communication system (RS-232C standard).

The local connection unit 40 is provided with a Centronics interface (parallel port) for connecting the MFP 1 to the PC 6 as a parallel port connection. This connection enable the print function or the like to be used from the PC 6 or the like.

The FAX unit 50 functions as a modem for performing a facsimile transmission/reception of FAX data via a public line.

The scanner unit 60, after the MFP controller 10 receives a request for processing a scan, scans an image, such as characters, graphics, or a photograph, from a paper document, and generates image data that is electronic data. It should be noted here that the scanner unit 60 may be provided with (i) an ADF that automatically scans a plurality of paper documents or (ii) a duplex function for performing a both side scanning.

The printer unit 70, upon receiving a request for processing a print from the MFP controller 10, prints the data that has been converted for printing, onto a sheet of paper, and outputs the printed paper. It should be noted here that the printer unit 70 may be provided with a finisher that has finishing functions such as sorting, punching holes, and stapling.

The operation panel 80 includes a touch panel liquid crystal display and various keys such as a numeric keypad, a start key, a stop key, and a screen switch key. The operation panel 80 plays a role of a dedicated control device used by the user to operate the MFP 1.

Figure 3:
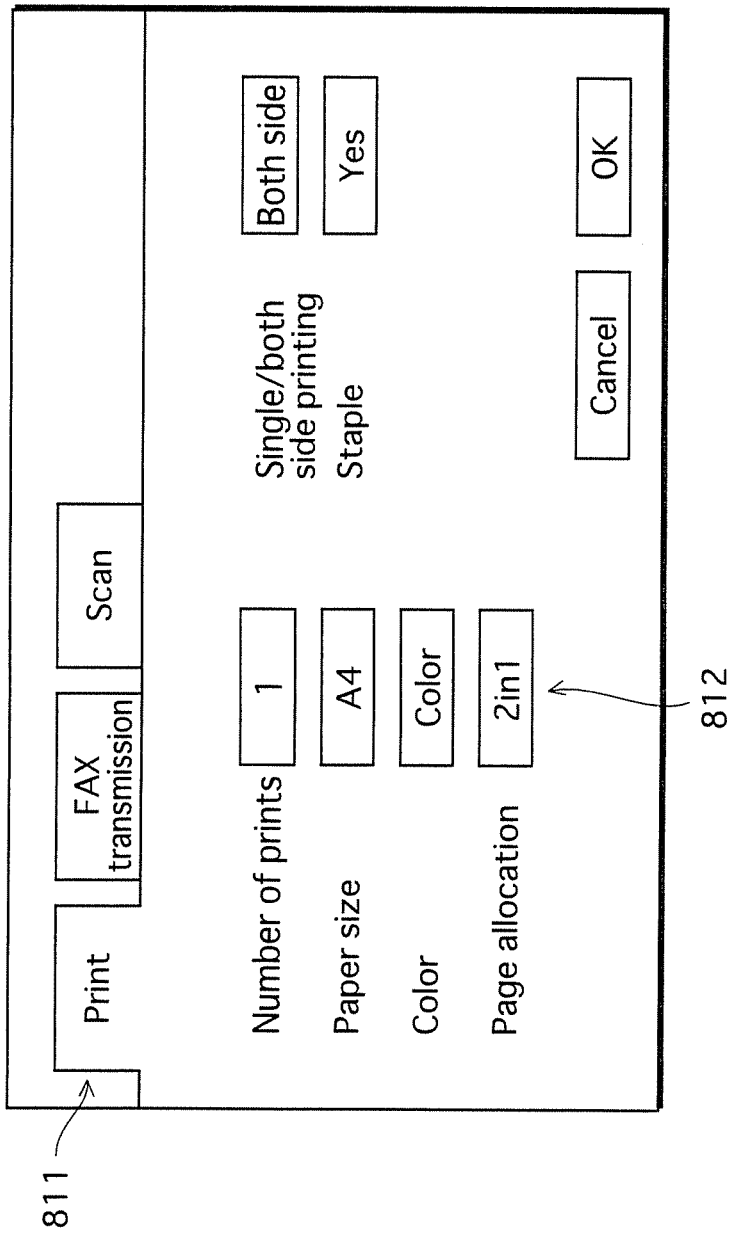
FIG. 3 shows an example of a job receiving screen displayed on the operation panel provided in the MFP.

FIG. 3 shows an example of a job receiving screen 81 displayed on the operation panel 80. The job receiving screen 81 is a screen for receiving, from the user, an input or a selection of a function for processing a job such as a print.

As shown in FIG. 3, the job receiving screen 81 displays tabs 811, boxes 812 and the like, where the tabs 811 are used for facilitating the user in selecting a function among the print, FAX transmission, scan and the like, and the boxes 812 are used to input the processing conditions (properties) in terms of the selected function.

The user can, for example, specify a function to execute, by touching the job receiving screen 81. For example, the user can specify a plurality of functions to execute, as shown in the following. To print an image and transmit the same image to an external facsimile device by a FAX transmission, first the user touches the tab 811 of the print to display the input screen for the print conditions (FIG. 3). On this screen, when the user touches the box 812 for the number of prints or color, another screen for selecting or inputting the desired number of prints is displayed, and the user can select or input the desired number of prints on the displayed another screen. After inputting the print conditions, the user clicks the tab 811 of the FAX transmission to switch the screen to the input screen for the FAX transmission conditions (not illustrated). Then, on the displayed screen, the user can input transmission conditions such as the transmission resolution and transmission destination, in the same manner as in inputting the conditions for printing. The input information is set as the processing conditions for the job when the user depresses the OK button after completing the input.

3. Structure of MFP Overall Control Software

Figure 4:
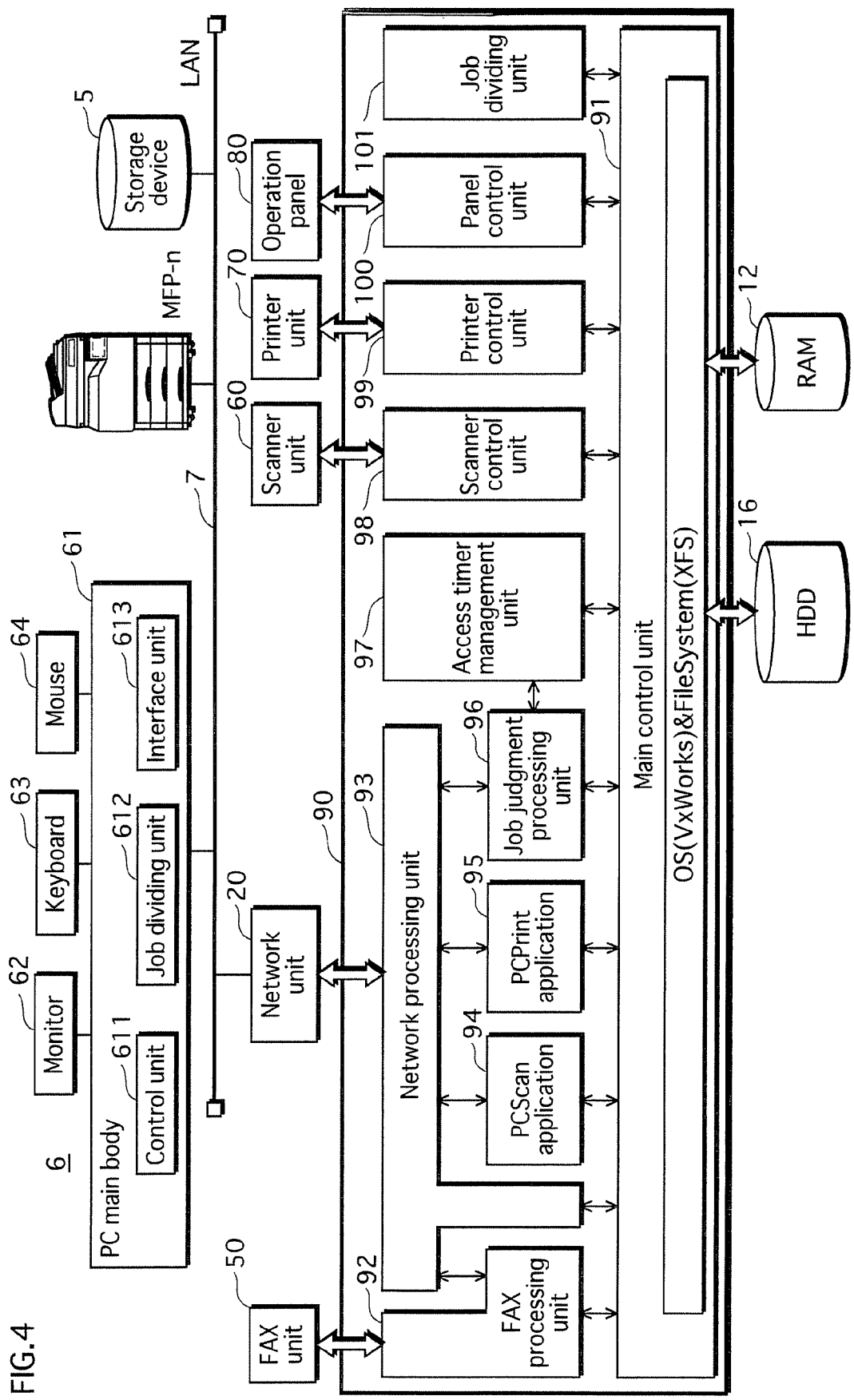
FIG. 4 is a block diagram showing the structure of the MFP overall control software.

FIG. 4 is a block diagram showing the structure of the MFP overall control software 90. As shown in FIG. 4, the MFP overall control software 90 includes various modules such as a main control unit 91, a FAX processing unit 92, a network processing unit 93, a PCScan application 94, a PCPrint application 95, a job judgment processing unit 96, an access timer management unit 97, a scanner control unit 98, a printer control unit 99, a panel control unit 100, and a job dividing unit 101.

The main control unit 91, a core of the overall control, controls control signals from other modules 92-101 as a whole. For example, the main control unit 91 controls the whole of a sequence, such as a scan operation sequence or a print operation sequence, in each stage of, for example, an activation, stop, resumption, discard, and interrupt of a copy process.

Further, the main control unit 91 generates or activates a system, receives a request for processing a job such as a print, copy, scan, or FAX, assigns a unique job ID to each job, and performs the assignment in sequence for each type. Upon receiving a request for deleting a job from the user, the main control unit 91 clears the job data. The main control unit 91 further controls accesses to the HDD 16 and the RAM 12, and controls accesses to the file system when the HDD 16 is treated as the file system using the OS function.

The FAX processing unit 92 controls the FAX data transmission/reception. Upon receiving a notification from the FAX unit 50 that it received FAX data, the FAX processing unit 92 requests the main control unit 91 to execute a job to receive the FAX data, and instructs to start processing the job. It should be noted here that the FAX data is transmitted or received using a public line via the FAX unit 50, or is transmitted or received as an Internet FAX via the network processing unit 93.

The network processing unit 93 processes a request that is received via the network unit 20. The received request is sent to the network processing unit 93 via a message queue provided by the OS. The network processing unit 93 processes the request in accordance with a message from the message queue, and the result of the process is sent to the network unit 20.

When it receives a request for processing a print job from the PC 6 via the network 7 and via the Internet (in conformance with the TCP/IP, IPX/SPX, SNMP or the like), the network processing unit 93 executes an interface process for a transmission to the PCPrint application 95. This enables the print job to be processed. Such an interface process with the network unit 20 is also executed in a similar manner between the network unit 20 and the main control unit 91, between the network unit 20 and the PCScan application 94, between the network unit 20 and the FAX processing unit 92, and between the network unit 20 and the job judgment processing unit 96.

The PCScan application 94 processes the scan job. More specifically, when the user requests a scan job from the operation panel 80, the panel control unit 100 notifies a start of the scan job via the main control unit 91. The PCScan application 94 processes the scan job in accordance with the notification to create an image file, and transmits the image file via the network processing unit 93 and the network unit 20 to the PC 6. It is also possible to request a scan from the PC 6. In this case, a start of the scan job is notified via the network processing unit 93.

The PCPrint application 95 processes a print job, where the request for the job is transmitted from the PC 6 via the network 7. More specifically, when the user requests a print job from the PC 6, the PCPrint application 95 receives, via the network processing unit 93, print job data described in a page description language such as the PDL, converts the data into bit map data, and transmits the bit map data to the main control unit 91 together with the print conditions.

The bit map data is transmitted from the main control unit 91 to the printer unit 70 via the printer control unit 99, and the image thereof is printed onto paper.

The job judgment processing unit 96 accesses the storage device 5 via the network processing unit 93, the network unit 20, and the network 7, and confirms whether there is a job that is registered with the storage device 5. If there is a job registered with the storage device 5, the job judgment processing unit 96 judges whether the own device can process the job, and further judges whether the own device should process the job. If it judges that the own device should process the job, the job judgment processing unit 96 downloads the job data from the storage device 5, notifies to the main control unit 91 that the own device processes the job, and transfers the job data to the main control unit 91. The main control unit 91 temporarily stores the received job data in the HDD 16 or the RAM 12, and processes the job. The job includes partial jobs that will be described later.

The access timer management unit 97 determines a timing (cycle) at which the job judgment processing unit 96 accesses the storage device 5, and transmits an access permission signal to the job judgment processing unit 96. The job judgment processing unit 96, upon receiving the access permission signal from the access timer management unit 97, accesses the storage device 5 and confirms whether there is a job that is registered with the storage device 5.

The access timer management unit 97 also includes a function to manage a clock of the MFP 1. The access timer management unit 97 further includes a function to calculate a time when, for example, measuring an end time of a processed job. The operation of the access timer management unit 97 will be described later in detail.

The scanner control unit 98 controls the scanner unit 60. More specifically, the scanner control unit 98 controls a sequence in correspondence with a document reading mode such as a character mode or a photograph mode, and in correspondence with a document reading form such as an ADF-used form or a manual placement form. The scanner control unit 98 controls the scanner unit 60 when a document is scanned for a FAX transmission.

The printer control unit 99 is a module for controlling the printer unit 70, and executes a print sequence in correspondence with the print conditions requested by the user. The print conditions that can be requested include either of the single side printing and the both side printing, and the stamp print or not. The printer control unit 99 further controls the printer unit 70 when a received FAX is printed or a print instructed from the PC 6 is performed.

The panel control unit 100 is a module for achieving a request of the user input from the operation panel 80, and executes an event process in accordance with a signal received from the operation panel 80. The panel control unit 100 executes all the screen process programs that are displayed on the operation panel 80. The event process is a pre-process to be executed after a screen is selected, a process for displaying a screen on the operation panel 80, a process requested by an input through a software key, or the like. The event process sends a notification to the main control unit 91 so that the process requested by the user through a panel operation can be executed, and transfers to the next screen to notify the user of the response of the MFP.

The job dividing unit 101, when a job including a plurality of functions that can be executed separately (for example, the print and FAX transmission described above) is requested to be executed from the operation panel 80, divides the job into partial jobs in correspondence with functions so that each function can be executed separately. The partial jobs are stored in storage areas (folders) that are respectively provided in the storage device 5 in correspondence with functions. The job division will be described later in detail.

4. Structure of PC 6

As shown in FIG. 4, the PC 6 includes a PC main body 61, a monitor 62, a keyboard 63, and a mouse 64. The PC main body 61 includes a control unit 611, a job dividing unit 612, and an interface unit 613.

The interface unit 613 is an interface for connecting to the network 7, and is a LAN card, a LAN board or the like.

Upon receiving an instruction to create a document from the user via the keyboard 63 or the mouse 64, the control unit 611 activates document creation application software, and creates the document data. Also, when issuing a job for causing the MFP 1 or the like to, for example, print the created document, the control unit 611 displays a job receiving screen on the monitor 62 for receiving selection of process conditions for the job, an input or the like from the user. The job receiving screen has the same structure as the above-described job receiving screen 81.

The user can specify a function to execute, from the job receiving screen. When the user depresses the OK button after completing the input, the control unit 611 sets the input information as the process conditions for the job, and creates document data and job data that includes the set process conditions.

The job dividing unit 612 is a module that has the same functions as the job dividing unit 101, and, when a job including a plurality of functions that can be executed separately is generated, divides the job into partial jobs in correspondence with functions so that each function can be executed separately.

<Operations of Image Processing Device and Image Processing System>

1. Operation Outline

First, an operation outline of the image processing system in the present embodiment will be described in comparison with the operation of a conventional image processing system.

Figure 5:
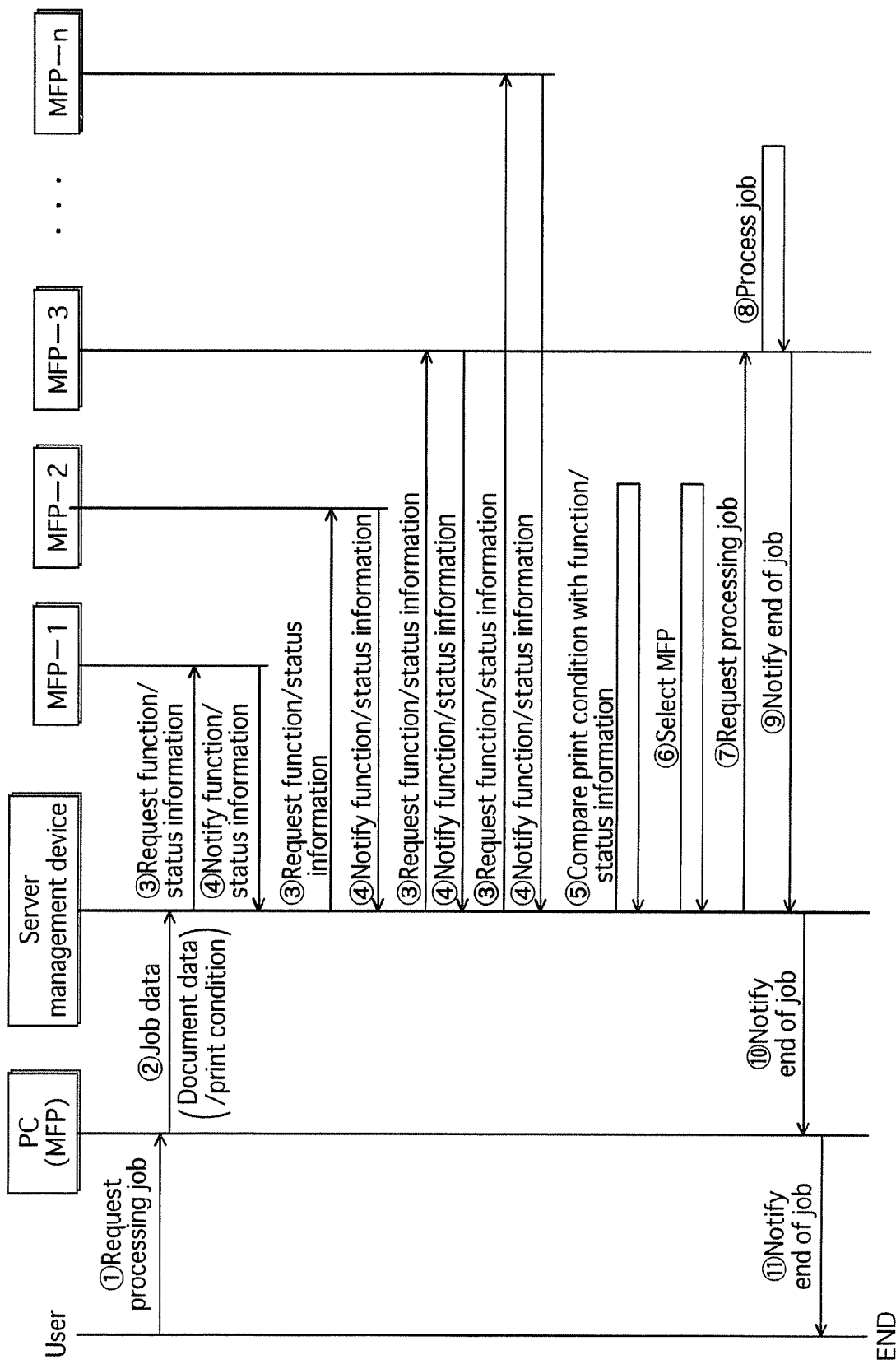
FIG. 5 is a sequence diagram showing an operation outline of a conventional image processing system.
Figure 6:
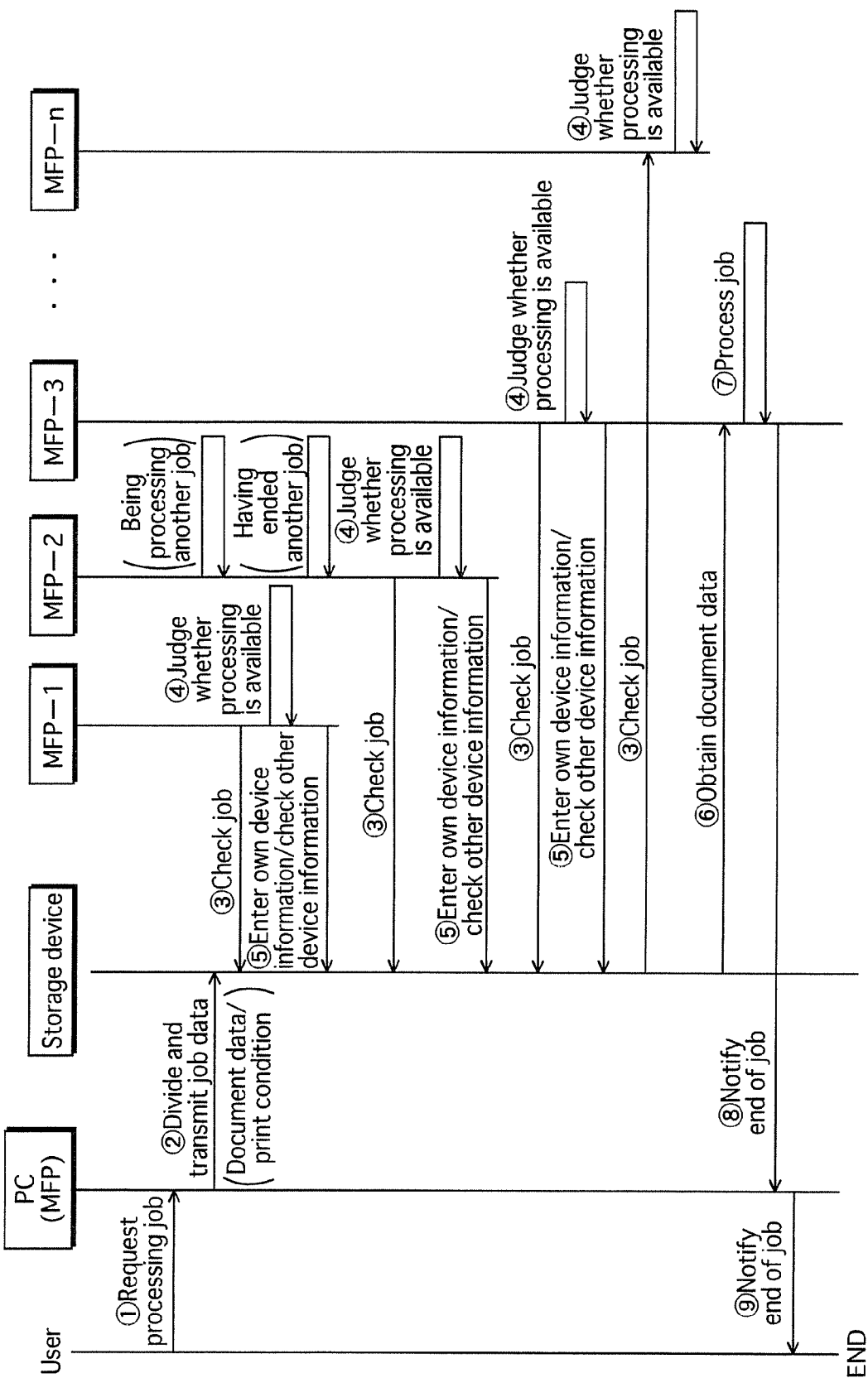
FIG. 6 is a sequence diagram showing an operation outline of the image processing system in the present embodiment.

FIG. 5 is a sequence diagram showing an operation outline of a conventional image processing system. FIG. 6 is a sequence diagram showing an operation outline of the image processing system in the present embodiment.

As shown in FIG. 5, in the conventional image processing system, (1) when the user inputs a request for processing a job from a PC (or from an MFP), (2) job data, which is composed of document data and print conditions, is transmitted from the PC to the server management device, and then (3) the server management device requests function/status information to each MFP.

It should be noted here that the function/status information is information that indicates executable functions and capabilities of each MFP. For example, the function/status information includes: print-related information that indicates color/monochrome, tone number, print speed, single/both side, magnification rate, paper size, and the like; FAX-related information that indicates G3/G4 standard, transmission speed, resolution, and the like; and information that indicates the current status of the MFP, such as waiting a job, executing, residual amount of paper, residual amount of toner, and the like.

(4) After the function/status information is notified to the server management device from all the MFPs, (5) the server management device compares the print conditions with the function/status information of all the MFPs, (6) selects a most suitable MFP, and (7) requests the selected MFP to process the job. (8) The selected MFP processes the job. (9) After completing the job, the MFP notifies the server management device of the end of the job. And (10), (11) the server management device notifies the user of the end of the job via the PC.

As understood from the above description, the conventional image processing system requires a server for selecting an MFP that processes a job. Further, to select the MFP, the server needs to obtain the function/status information from all the MFPs in the system, where the function/status information has a large amount of information due to the multiple functions of the MFP. Accordingly, as the number of MFPs in the system increases, the load applied to the network increases as much. Also, when it takes a long time to obtain the function/status information from all the MFPs in the system, the processing of the job may be delayed.

Further, if a request for job A, specifying a plurality of functions therefor, is entered, then there is only one MFP in the system that can process all the functions included in the job, then it takes a long time for the MFP to complete processing the all functions, and then a request for job B, specifying the same functions as the job A, is entered before completion of processing of job A, job B cannot be processed until processing of job A is completed.

On the other hand, in the image processing system of the present embodiment, as shown in FIG. 6, (1) when the user inputs a request for processing a job from the PC 6 (or from an MFP), (2) the job data therefor is transmitted to the storage device 5 and stored therein. If the requested job is dividable, the job is divided into partial jobs. (3) Each of the MFPs 1, 2, 3, 4, . . . n checks at regular intervals whether an unprocessed job (including a partial job) is stored in (registered with) the storage device 5, and if it judges that an unprocessed job is registered with the storage device 5, (4) each MFP judges whether or not the own device (the MFP itself) can process the job.

(5) MFPs (in the example shown in FIG. 6, MFP 1 through MFP 3) that have judged that the own device can process the job store "own device information" (make an entry of the own device information) into a predetermined folder in the storage device 5, to indicate that the MFPs desire to process the job. The own device information is information that indicates conditions of the devices (MFPs) themselves to process the job (the own device information will be described later in detail). Each of the MFPs also checks whether other MFPs have made entries of the own device information for the job (hereinafter, the own device information made entry by other devices (MFPs) is referred to as "other device information"). If other device information has been made entry, each of the MFPs compares the own device information with the other device information, and judges whether or not the own device is the most suitable MFP to process the job.

On the other hand, MFPs (in the example shown in FIG. 6, MFP n) that have judged that the own device cannot process the job neither make entry of the own device information, nor check whether the other device information has been entered.

(6) The MFP (in the example shown in FIG. 6, MFP 3) that has judged that the own device is the most suitable MFP to process the job obtains the document data, (7) processes the job, and (8), (9) notifies the user of the end of the job via the PC 6.

As described above, in the image processing system 8 of the present embodiment, each MFP judges whether or not the own device should process an unprocessed job. This structure eliminates the need for a server having a function to select an MFP. Further, in this structure of the present embodiment, only MFPs that have judged that the own devices can process the job transmit the own device information (corresponding to the function/status information of the conventional technology) to the storage device 5. Accordingly, compared with the conventional structure in which all MFPs transmit the information to the server, even if the system has a large number of MFPs, it hardly adds a load to the network, and hardly causes the processing of the job to be delayed.

Further, according to the structure of the present embodiment, a dividable job is divided into partial jobs in correspondence with functions, and each MFP judges whether the own device can process a partial job for each of the partial jobs, and executes. This enables a plurality of functions divided from a job to be executed by a plurality of MFPs. This structure, compared with the case where one MFP executes all the functions, reduces the amount of load that is applied to one MFP, and achieves a smooth job processing.

2. Details of Operation

Figure 7:
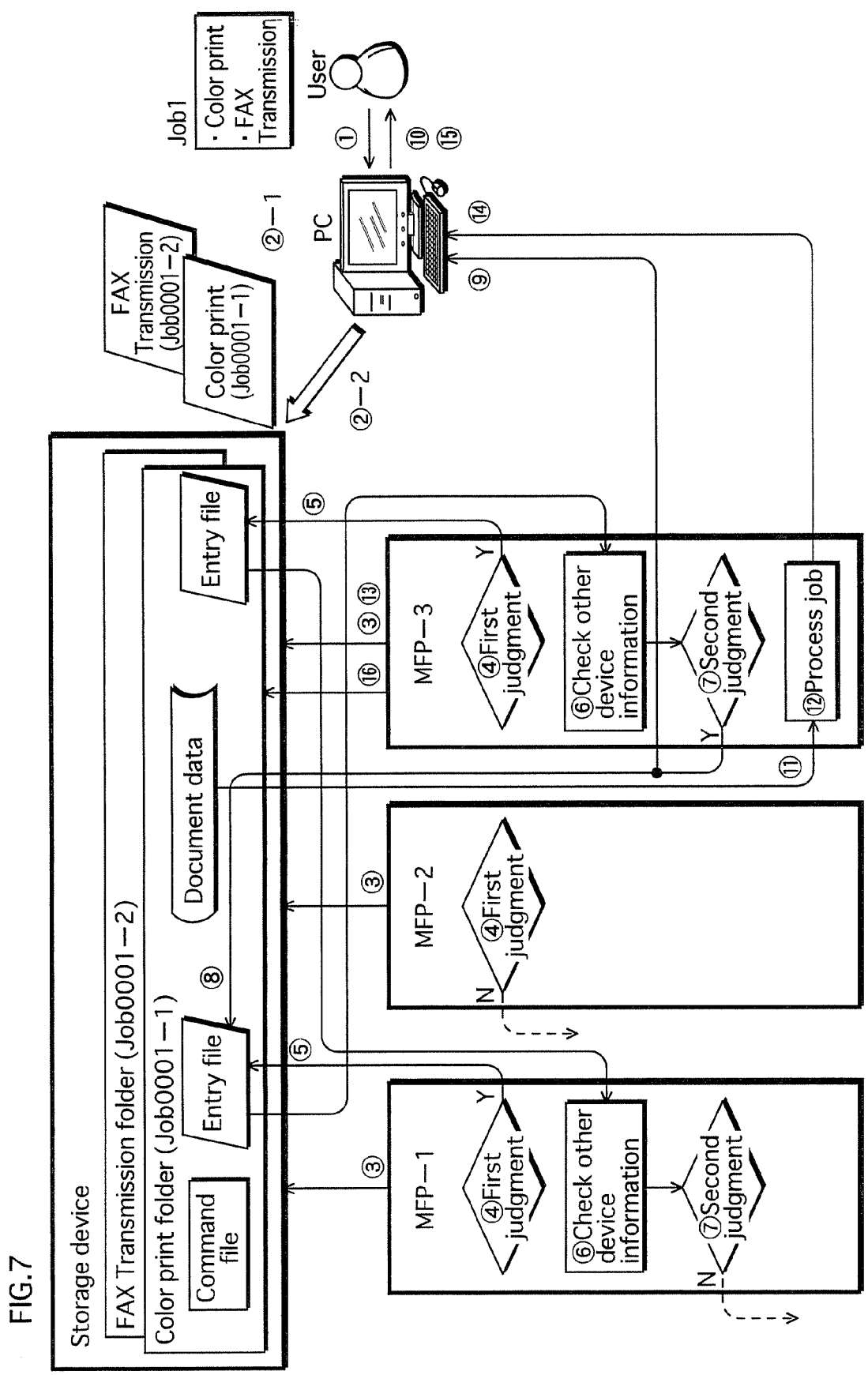
FIG. 7 schematically shows the operation of the image processing system in the present embodiment.
Figure 8:
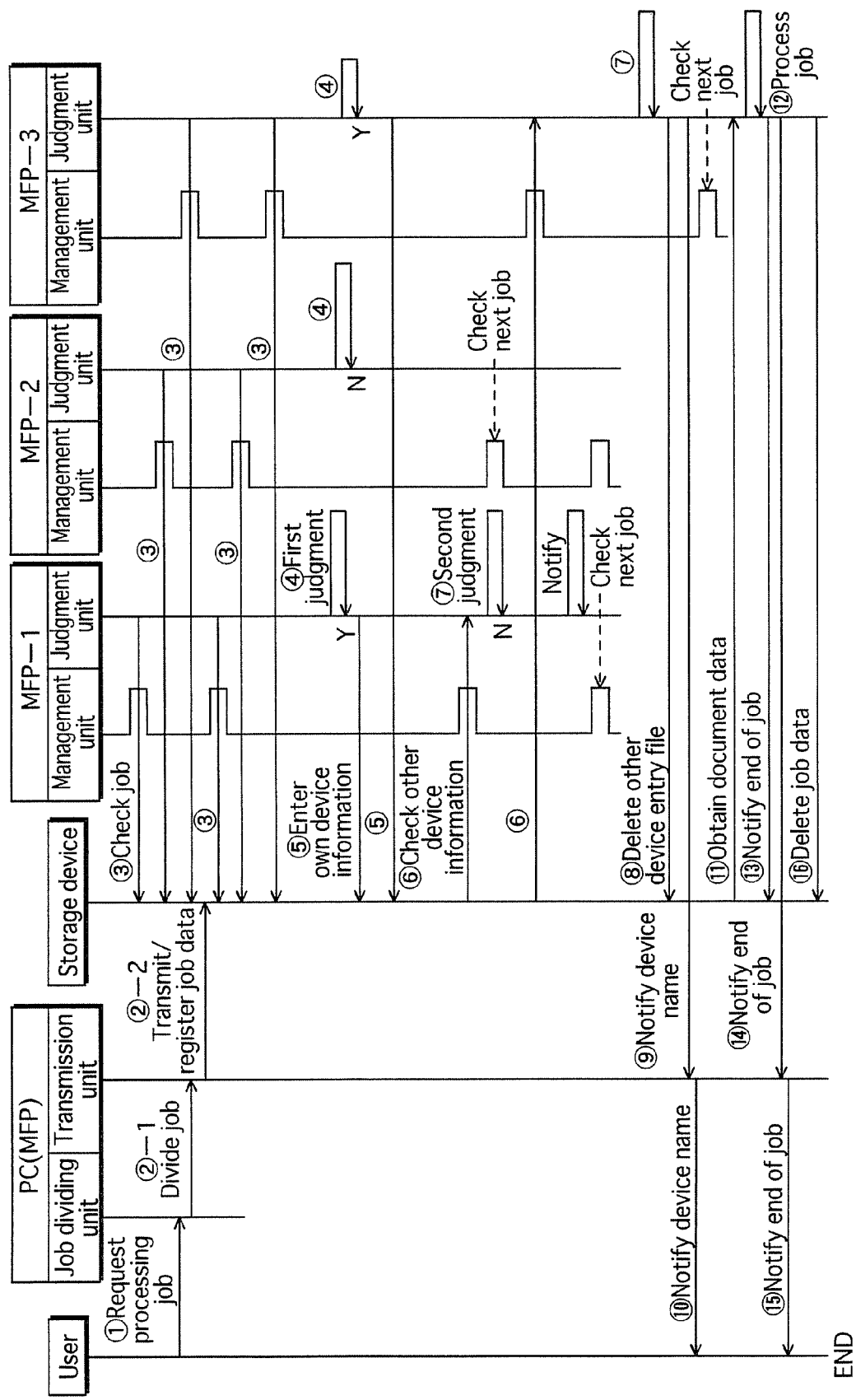
FIG. 8 is a sequence diagram showing a detailed operation of the image processing system.

FIG. 7 schematically shows the operation of the image processing system 8 in the present embodiment. FIG. 8 is a sequence diagram showing a detailed operation of the image processing system 8. It should be noted here that, in FIG. 8, the job judgment processing unit 96 and the access timer management unit 97 are respectively indicated in abbreviated forms "judgment unit" and "management unit". FIG. 9 shows an example of job data. FIG. 10 shows a job list that is created by the storage device 5.

The following is a description of operations (1) through (16) when a job is processed by an image processing system having three MFPs, in an example case where a job, for which a color print function and a G3 FAX transmission function have been specified, is entered from the PC 6 into the storage device 5.

(1) Request for Processing Job

As shown in FIGS. 7 and 8, the user inputs a request for processing a job from, for example, the PC 6. When inputting the request for processing a job, the user can also input the processing conditions (properties), such as print conditions, on the job receiving screen displayed on the monitor 62 of the PC 6. When a job processing request is received, job data is created. As shown in FIG. 9, the job data is composed of a job ID, document data that is a target of the job processing, process condition (property), and the like. The job ID (in the example shown in FIG. 9, "Job0001") is uniquely assigned to a job in the order that jobs are registered with the storage device 5.

In the example shown in FIG. 9, the print condition and FAX transmission condition are shown as an example of the process condition. The print condition is composed of such items as color, document size, output size, number of prints, page allocation, single/both side printing, and staple, and the FAX transmission condition is composed of such items as document size, transmission standard, resolution, and F code.

(2) Dividing Job, Transmitting and Registering Job Data (2-1) Dividing Job

As shown in FIGS. 7 and 8, upon receiving the job processing request, the PC 6 divides the requested job into partial jobs if the requested job is a dividable job specifying a plurality of functions.

FIG. 11A shows steps in the division process performed by the job dividing unit 612 of the PC 6. FIG. 11B shows a classified function item table 6121.

In step 621, the job dividing unit 612 judges whether the job requested by the user specifies a plurality of functions. The judgment is made by referring to the job process condition (FIG. 9) contained in the job data.

FIGS. 12A through 12C show specific examples of data structure of the process condition.

As shown in FIG. 12, the process condition is written in XML (Extensible Markup Language). Here, the Job ID tag indicates the identification number of the job.

The Function tags such as Function 1 and Function 2 respectively indicate the functions that were specified by the user as the process condition. The Parameter tags indicate parameters for each function. The job dividing unit 612 judges that the job includes a plurality of functions if it detects a plurality of Function tags (Function 1 and Function 2 or the like).

With regard to the example shown in FIG. 12A, it is judged that the job specifies a plurality of functions. If there is only one Function tag (for example, Function 1), it is judged that the job specifies a single function, and the division of the job is not performed.

If it judges that the job specifies a plurality of functions, the job dividing unit 612 judges, in step 622, which predetermined classified function items the specified functions belong to. The judgment is made by referring to the classified function item table 6121 shown in FIG. 11B. The classified function item table 6121 is information indicating function items to which functions that can be specified with a job belong. In the present example, the table is stored in the control unit 611 of the PC main body 61. As shown in FIG. 11B, for example, the color print function item includes detailed items such as those indicating color print and color print plus woven pattern print.

It is checked for each of the functions specified in the requested job whether the specified function matches any of the detailed function items, and identifies the function item to which the detailed function item belongs. For example, it is judged that "color print" belongs to the color print function, and "G3 FAX transmission" belongs to the FAX transmission function item.

In step 623, the job dividing unit 612 divides the job into partial jobs, with the definition that a job for processing a function belonging to a function item is a partial job. More specifically, the job dividing unit 612 extracts a data portion 631 separated by the Function 1 tag, as the process condition for the color print function job after the division, and generates data 633 (FIG. 12B) by attaching a job ID "0001-1" to the extracted data portion. The job dividing unit 612 then generates data that shows relationships between the document data and the data 633, as partial job data after the division.

Similarly, the job dividing unit 612 extracts a data portion 632 separated by the Function 2 tag, as the process condition for the FAX transmission function job after the division, and generates data 634 (FIG. 12C) by attaching a job ID "0001-2" to the extracted data portion. The job dividing unit 612 then generates data that shows relationships between the document data and the data 634, as another partial job data after the division. It should be noted here that in the above description, the process condition is written in XML. However, not limited to this, the process condition may be written in any language as far as the process condition can be represented. Also, in the above description, a case of a job specifying the color print and FAX transmission is explained. However, not limited to this, for example, a job specifying the scan transmission and FAX transmission may be entered and divided into partial jobs, as a job specifying a plurality of function items.

(2-2) Transmission/Registration of Job Data

The control unit 611 transmits the partial job data after the division to the storage device 5 so that the storage device 5 stores the received partial job data.

Figure 13:
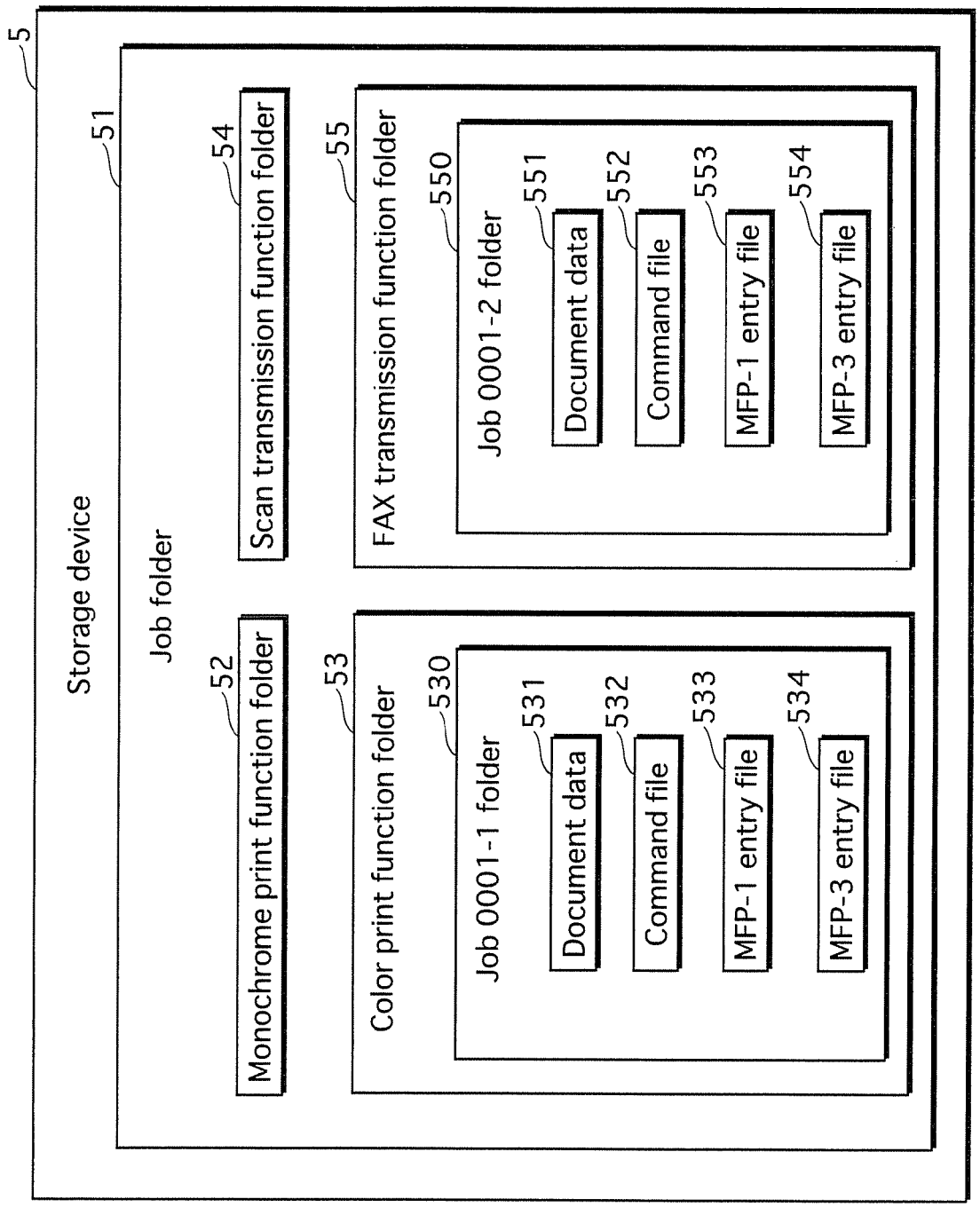
FIG. 13 schematically shows the structure of a storage area of the storage device.

FIG. 13 schematically shows the structure of a storage area of the storage device 5.

As shown in FIG. 13, the storage area of the storage device 5 includes a job folder 51. The job folder 51 includes function folders 52-55 that correspond to the function items provided in the classified function item table 6121 shown in FIG. 11B. The function folders 52-55 store the partial job data respectively in correspondence with the function items.

As shown in FIG. 13, a color print function folder 53 includes a folder 530 for storing the partial job 0001-1, and the example shows that the folder 530 stores various pieces of data relating to the partial job 0001-1, such as document data 531, command file 532, MFP-1 entry file 533, and MFP-3 entry file 534. Here, the document data 531 corresponds to the above-described document data, and the command file 532 corresponds to the above-described data 633. The MFP-1 entry file 533 and MFP-3 entry file 534 will be described later.

A FAX transmission function folder 55 includes a folder 550 for storing the partial job 0001-2, and the example shows that the folder 550 stores various pieces of data relating to the partial job 0001-2, such as document data 551, command file 552, MFP-1 entry file 553, and MFP-3 entry file 554. Here, the document data 551 corresponds to the above-described document data, and the command file 552 corresponds to the above-described data 634. The MFP-1 entry file 553 and MFP-3 entry file 554 will be described later. The command files 532 and 552 are referred to as the process condition of the partial job by each MFP via the network 7, as will be described later. The command files 532 and 552 are used as information that is used by each MFP to judge whether or not the own device can process the partial job.

It should be noted here that the document data may be generated separately for each folder, by copying or the like, or one piece of document data may be shared. When one piece of document data is shared, for example, the document data is preliminarily correlated with the command files of the partial jobs, and each MFP that processed one of the partial jobs writes into the storage device 5 to indicates that the MFP processed the partial job so that it can be judged which partial jobs remain unprocessed. Further, after the last partial job is processed, the MFP that processed the last partial job may delete the document data from the storage device 5, judging that the document data is no longer used. The sharing enables the storage area in the storage device 5 to be used effectively.

When the job is not divided into partial jobs, the job is treated as a normal job, and the job data is stored in the corresponding function folder, as it is. With the storing into the storage device 5, the job or the partial job is registered, and the job list as is shown in FIG. 10 is generated in the storage device 5. Hereinafter, if there is no need to distinguish between partial jobs after a division and normal jobs without a division, they will merely be referred to as "jobs".

(3) Checking Job

As shown in FIGS. 7 and 8, each of the MFPs 1, 2, and 3 accesses the storage device 5 at a predetermined cycle, and performs a job check for confirming whether or not an unprocessed job is registered with the storage device 5. The access timer management units 97 of the MFPs 1, 2, and 3 generate an access timing signal at the same cycle, and access the storage device 5, using as a trigger a point in time when the access timing signal becomes the enable state.

As shown in FIG. 8, the access timer management unit 97 starts generating the access timing signal when the main bodies of the MFPs 1, 2, and 3 are powered on. Accordingly, the access timing signals generated by the MFPs 1, 2, and 3 do not necessarily match in phase, and ordinarily have different phases as shown in the example of FIG. 8. The present embodiment describes a case where the MFPs have different phases. However, although the phases differ from each other, ordinarily the difference is only several milliseconds. Accordingly, it can be considered that the phases substantially match each other. It should be noted here that the clock function of the access timer management unit 97 may be used to cause the phases of the MFPs to match each other.

When each of the MFPs 1, 2, and 3 has completed the first job check, no unprocessed job is not registered with the storage device 5. At this time, each of the MFPs 1, 2, and 3 is in wait state. When each of the MFPs 1, 2, and 3 has completed the second job check, an unprocessed job is registered with the storage device 5, and each of the MFPs 1, 2, and 3 detects the registration. If a plurality of partial jobs are registered as unprocessed jobs, one of them, for example, one with a smaller value of the job ID is first detected to be processed as follows. In the above-described example, the color print function job of the job with job ID "0001-1" is first detected and is subjected to the following process, and then the G3 FAX transmission function job of the job with job ID "0001-2" is detected and is subjected to the following process. Here, first, the case where the color print function job is detected as an unprocessed job will be explained.

Upon detecting that an unprocessed job is registered, the job judgment processing unit 96 notifies the access timer management unit 97 of the registration.

(4) First Judgment

The job judgment processing unit 96 of each of the MFPs 1, 2, and 3 judges, as the first judgment, whether or not the own device can process the detected job.

Figure 14:
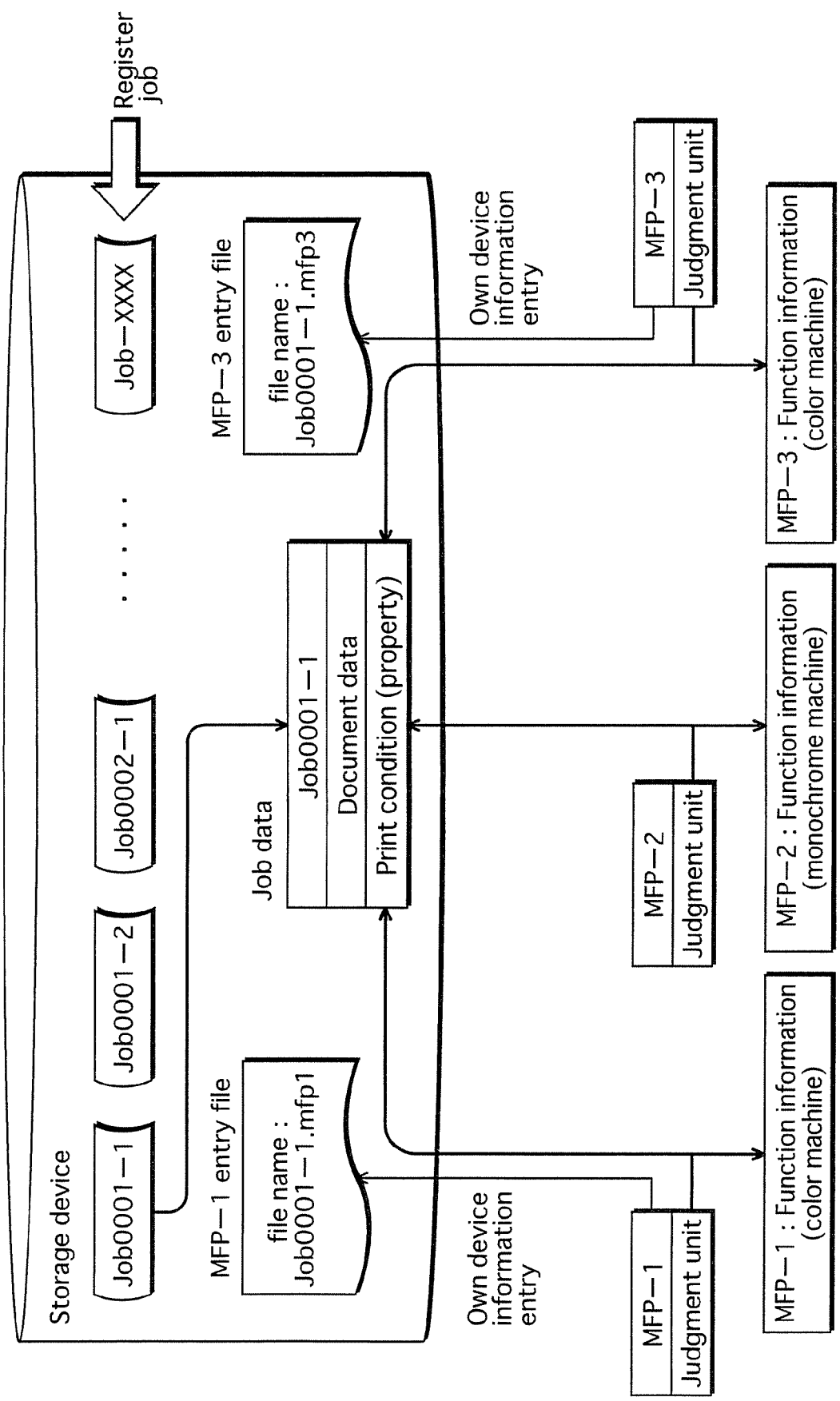
FIG. 14 schematically shows the first judgment that is performed by the MFP on a job.

FIG. 14 schematically shows the first judgment. FIG. 15 shows the function information of each MFP shown in FIG. 14.

As shown in FIG. 14, the job judgment processing unit 96 of each of the MFPs 1, 2, and 3 obtains the process condition for the job data, from the storage device 5, and judges whether or not the own device can process the job. The judgment is made by comparing the obtained process condition with the information (function information) regarding the image processing function loaded in the own device. More specifically, when the obtained process condition (the process condition for the color print function job of the job with job ID "0001-1") is the print condition shown in FIG. 9, and when the function information of each of the MFPs 1, 2, and 3 is as shown in FIG. 15, color machines MFP 1 and MFP 3 satisfy the print condition. On the other hand, MFP 2 is a monochrome machine and does not satisfy the print condition. As a result, MFP 1 and MFP 3 judge that the own device can process the job. It should be noted here that the function information is preliminarily stored in the flash memory 14 or the like of the own device, namely, the MFP itself.

In each of the MFPs 1, 2, and 3, upon receiving the notification from the job judgment processing unit 96, the access timer management unit 97 changes the cycle of the access timing signal, as shown in FIG. 8. More specifically, the access timer management unit 97 changes the cycle to approximately two times the current cycle+α. The reason is that since, as described above, the cycle of the access timing signal of each of the MFPs 1, 2, and 3 is set to substantially a same value, if the cycle is set to at least two times the current cycle, all the MFPs 1, 2, and 3 in the system access the storage device at least once in the cycle before the change before they access the next time, and can make entry of the own device information into the storage device.

It should be noted here that the cycle of the access timing should not necessarily be changed. This is because the longer the interval between the access timings are, the longer the wait time for the unprocessed job is. For example, when an MFP receives a FAX transmission job while it is performing a print job, the job check can be done faster than in the case where the cycle of the access timing is changed to be longer.

On the other hand, the job judgment processing unit 96 of the MFP 2 judges in the first judgment that the own device cannot process the job, and notifies the access timer management unit 97 that it does not make an entry for the job with job ID "0001-1". Upon receiving the notification, the access timer management unit 97 returns the cycle of the access timing signal to the cycle before so that the MFP 2 can perform the next job check soon.

(5) Entry of Own Device Information

The MFP 1 and MFP 3, which have judged that the own device can process the job, make entries of the own device information, respectively. More specifically, the MFP 1 and MFP 3 generates entry files, and store the generated entry files into the storage device 5 (register the generated entry files with the storage device 5). The entry file generated by the MFP 1 corresponds to the entry file 533 shown in FIG. 13, and the entry file generated by the MFP 3 corresponds to the entry file 534. It should be noted here that a description that MFPs 1 and 3 made entries for the job with job ID "0001-1" is written in the job list of the storage device 5, as shown in FIG. 10. On the other hand, the MFP 2, which judged that the own device cannot process the job, has not made entry for the job.

FIGS. 16A and 16B show examples of entry files. The entry file name, such as "job ID.MFP name", is determined in conformance with a predetermined rule so that a piece of job data corresponds to an MFP on a one-to-one basis.

Capability information and status information are written into entry files.

The capability information, in the case of printing, includes: information regarding productivity such as the system speed, first copy time, maximum number of copies, paper feeding capacity, and outlet tray capacity; information regarding image quality such as the resolution (for example, 600 dpi or 1800 dpi), tone number (for example, "256"), character/photograph mode; and information regarding cost such as the service maintenance cost, paper type (for example, recycled or genuine), power consumption, device life (use frequency, toner residual amount or the like).

The status information includes information indicating the status of the device which may be "processing job", "in warmup", or "in wait".

Each of these information is device information indicating conditions with which the own device can process the job if it processes the job. Information indicating the status or value that may change, such as the current status or paper in tray, is rewritten each time an entry file is created, except for fixed information such as the system speed.

The information is written in the items of the entry file that are arranged in the order of priority, from the highest priority to the lowest priority. The priorities are arbitrarily set by, for example, the user or manager. In the present example, the same priority is set to all MFPs in the image processing system 8. This is done for the purpose of enabling each MFP in the system to judge, based on the same standards, whether the own device can process the job (the second judgment which will be described later).

FIG. 16A shows examples of productivity oriented entry files. In the example, the system speed is written as the highest item with respect to the information regarding productivity, and the power consumption is written as the lowest item with respect to the information regarding cost. On the other hand, FIG. 16B shows an example of a cost oriented entry file in which the power consumption is written as the highest item, in reverse to the productivity oriented entry files.

(6) Checking Other Device Information

The MFP 1 and MFP 3, when checking the next job, check whether the storage device 5 includes an entry of other device information, and if the storage device 5 includes an entry of other device information, obtain the entry file. On the other hand, the MFP 2 does not check whether the storage device 5 includes an entry of other device information, but starts checking another job.

Figure 17:
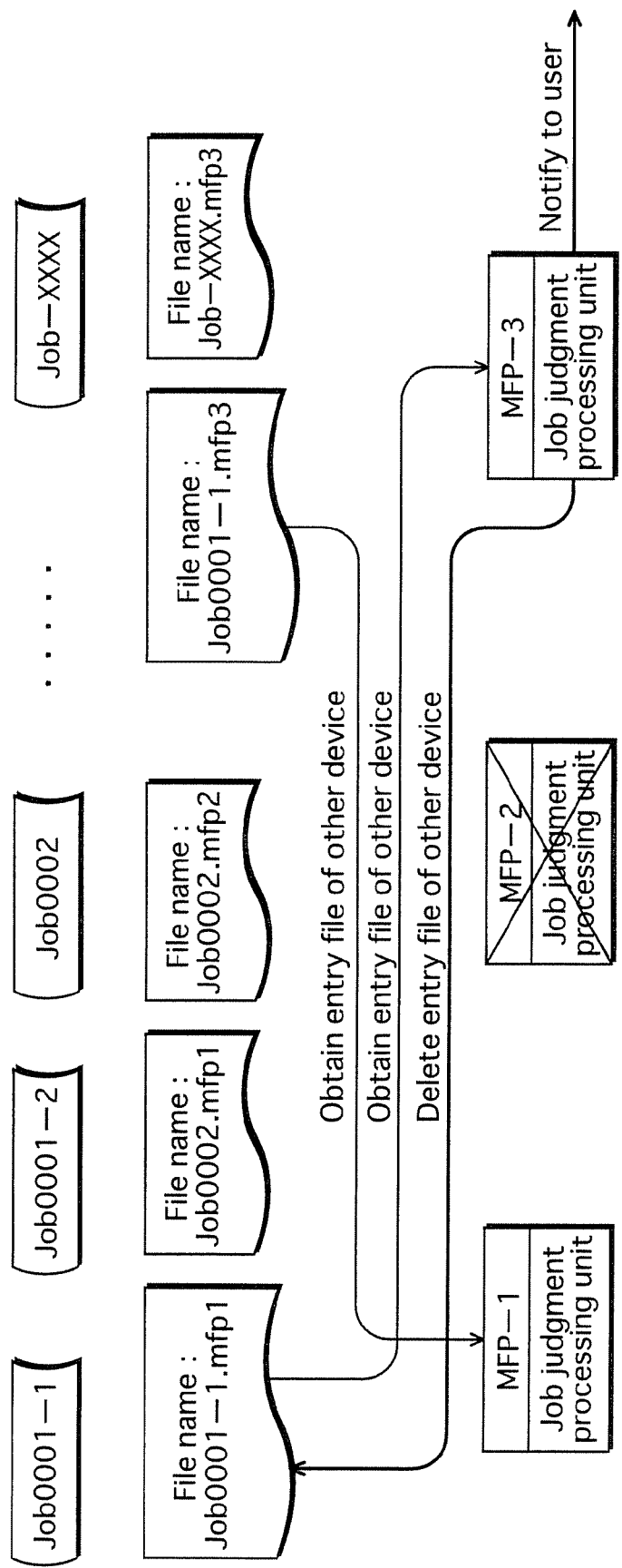
FIG. 17 schematically shows how the other device information is checked by the MFP.

FIG. 17 schematically shows how the other device information is checked.

As shown in FIG. 17, the job judgment processing unit 96 of each of the MFP 1 and MFP 3 that made entries for the job obtains the entry file of the other device (MFP 1 or MFP 3) from the storage device 5, using as a trigger a point in time when the access timing signal becomes the enable state. It should be noted here that the entry file can be obtained by downloading it into the MFP 1 or MFP 3, or by opening the entry file in the storage device 5 without downloading.

The job judgment processing unit 96 of each of the MFP 1 and MFP 3 obtains entry files for Job0001-1 by referring to the file names of the entry files. More specifically, the job judgment processing-unit 96 searches for entry files with file names whose first half (a portion before the period) is "Job0001-1", and obtains only entry files of other MFPs, except for the entry file of the own device. If there is only the entry file of the own device, the job judgment processing unit 96 obtains no entry file. It should be noted here that the entry file of the own device may also be obtained in addition.

In the example shown in FIG. 17, the MFP 1 obtains "Job0001-1.mfp3" that is the entry file of the MFP 3 for Job0001-1, and the MFP 3 obtains "Job0001-1.mfp1" that is the entry file of the MFP 1 for Job0001-1.

(7) Second Judgment

In the second judgment, each of the MFP 1 and MFP 3 that made entries for the job determines the most suitable MFP for processing the job. The judgment is made by comparing the contents of each entry file stored in the storage device 5.

In the comparison of the contents of each entry file, the print conditions obtained by the job judgment processing unit 96 of each MFP are referred to, and the entry file conditions are checked in sequence in the order from the most highest priority to the lowest priority.

In the case of the example shown in FIG. 16A, first a comparison is made with respect to the system speed. The MFP 1 and MFP 3 judge that there is no difference in priority since both has the system speed of 45 ppm. Next, a comparison is made with respect to the current status. The MFP 1 is in warmup and cannot process the job immediately, while the MFP 3 is in wait and can process the job immediately. From this comparison result, the MFP 1 and MFP 3 judge that the MFP 3 is more suitable for processing the job than the MFP 1.

The judgment is made by the job judgment processing units 96 of the MFP 1 and MFP 3, respectively. However, since the judgment is made based on the predetermined standards that are common to the MFPs, the MFPs that perform the judgment reaches the same conclusion. That is to say, both the job judgment processing units 96 of the MFP 1 and MFP 3 judge that the MFP 3 is the most suitable MFP for processing the job.

In the MFP 1, which is judged not to be the suitable MFP, the job judgment processing unit 96 notifies the access timer management unit 97 that the own device does not process Job0001-1. Upon receiving the notification, the access timer management unit 97 returns the cycle of the access timing signal to the cycle before so that the MFP 1 can perform the next job check soon.

(8) Deleting Other Device Entry Files

As shown in FIG. 17, the MFP 3, which has been judged to process the job, deletes the entry files of the other MFPs. More specifically, the MFP 3 deletes "Job0001-1.mfp1" that is the entry file of the MFP 1 for Job0001-1. With this deletion, among entry files for Job0001-1, only "Job0001-1.mfp3" that is the entry file of the MFP 3 remains in the storage device 5. This indicates that the MFP 3 is to process Job0001-1.

Here, even if entry files of the other MFPs are deleted, there is still a possibility that another MFP refers to "Job0001-1" at a certain timing and creates an entry file. For this reason, the MFP 3 may change the job file name "Job0001-1" to, for example, "Dmfp3-job0001-1", in addition to deleting entry files of the other MFPs. This prevents the other MFPs from creating entry files once it is determined that the MFP 3 is to process the job, and it is clearly indicated that the MFP 3 is to process the job ("Job0001-1").

(9) Notifying Device Name to PC

The job judgment processing unit 96 of the MFP 3 notifies, to the PC 6 that requested for processing the job, that the MFP 3 is to process the job.

(10) Notifying Device Name to User

The PC 6 notifies the user, who requested for processing the job, of an MFP that is to output a print, as a result of the job.

(11) obtaining Job Data

The MFP 3 downloads document data of Job0001-1 from the storage device 5.

(12) Processing Job

The MFP 3 processes the job with the print condition specified by the user.

(13) Notifying End of Job to Storage Device

After the job ends, the MFP 3 deletes information regarding the job from the job list stored in the storage device 5, as a job end notification to the storage device 5.

(14) Notifying End of Job to PC

After the job ends, the MFP 3 notifies the PC 6, which requested for processing the job, of the end of the job.

(15) Notifying End of Job to User

Upon receiving the job end notification, the PC 6 notifies the user of the end of the job by, for example, displaying on the monitor 62 a message indicating the end of the job. This enables the user to know that paper, on which document data is printed, is output from the MFP 3.

(16) Deleting Job Data

The MFP 3 deletes job data Job0001-1 of the completed job from the storage device 5. More specifically, the MFP 3 deletes the folder 530 (including the files containing the document data in the folder) that corresponds to Job0001-1. It should be noted here that, when one piece of document data is shared by two or more partial jobs, the document data is not deleted until the last partial job ends.

Up to now, the color print function job has been described. When the next job check is performed, the G3 FAX transmission function job that has been unprocessed is processed in a similar manner.

Figure 18:
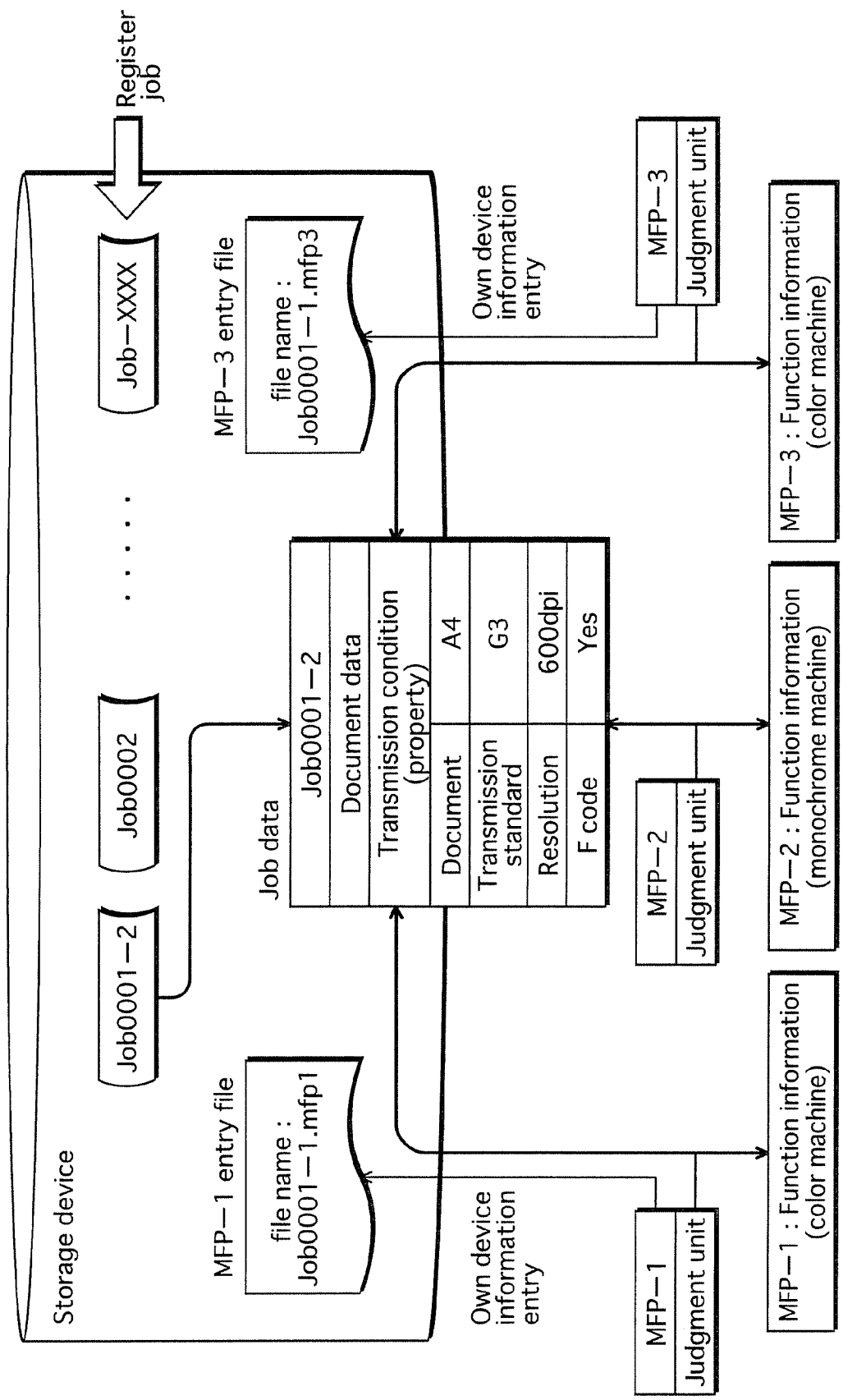
FIG. 18 schematically shows the first judgment that is performed by the MFP on another job.

FIG. 18 schematically shows the first judgment for the G3 FAX transmission function job. FIG. 19 shows examples of entry files for the job.

As shown in FIG. 18, as is the case with the color print function job, each of the MFPs 1, 2, and 3 judges whether or not the own device can process the job, based on the function information of the own device and the job transmission condition, and then MFPs having judged that the own device can process the job make an entry of the own device information into the storage device 5 ((3) through (5) in FIG. 8). FIG. 18 shows an example where the MFP 1 and the MFP 3 make entries. Each of the MFP 1 and MFP 3 that made entries for the job obtains the entry file of the other device ((6) in FIG. 8), and judges whether the own device should process the job (the second judgment) ((7) in FIG. 8).

By comparison between the entry file of the MFP 1 (corresponding to the entry file 553 shown in FIG. 13) and the entry file of the MFP 3 (corresponding to the entry file 554 shown in FIG. 13) that are shown in FIG. 19, it is found that the MFP 1 satisfies the transmission condition with respect to the resolution item. As a result, the MFP 1 judges that the own device should process the job, and the MFP 3 judges that the own device should not process the job. Having judged that the own device should process the job, the MFP 1 deletes the other entry files, notifies the job request source that the own device is to process the job, then obtains the document data from the storage device 5, transmits the obtained document data to a specified destination by facsimile, and notifies the end of job ((8) through (15) in FIG. 8). Each time an unprocessed job is registered, the job is processed in a similar manner to the above-described one.

As described above, the document created by the PC is printed by the MFP 3, and is transmitted by facsimile by the MFP 1. In this way, a plurality of functions are distributed to different MFPs to be processed by them.

<Operation of PC 6>

Figure 20:
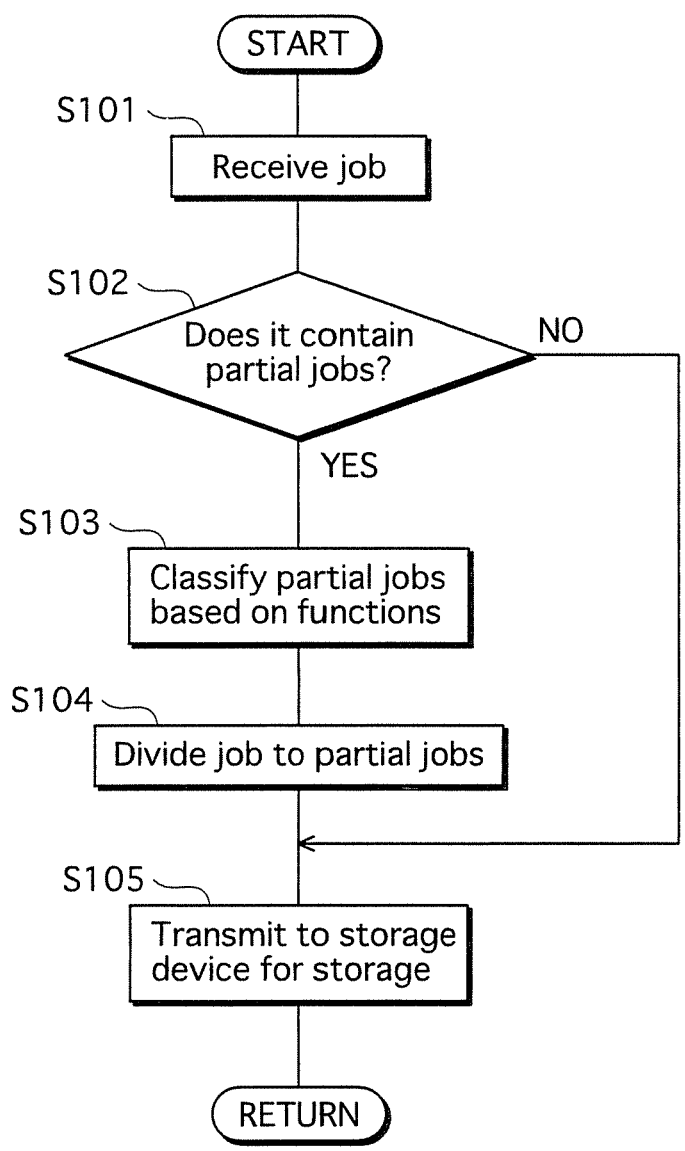
FIG. 20 is a flowchart of the job division process performed by the PC.

FIG. 20 is a flowchart of the job division process performed by the PC 6. The job division process is performed by the CPU or the like in accordance with a control program stored in a storage unit such as a ROM (not illustrated) loaded in the PC main body 61. Further, although not illustrated, a main routine is provided. In the main routine, each time the subroutine is called, the subroutine is executed. The call is made when, for example, the user instructs to execute a job such as a print.

As shown in FIG. 20, upon receiving an instruction to execute a job (step S101), the PC 6 judges whether or not the unprocessed job specified by the received instruction includes a plurality of partial jobs (step S102). The judgment is made in the same way as in the step 621 described above.

If it judges that the unprocessed job does not include a plurality of partial jobs, namely, that the job specifies only one function (NO in step S102), the PC 6 moves to step S105.

On the other hand, if it judges that the unprocessed job includes a plurality of partial jobs (YES in step S102), the PC 6 classifies the partial jobs based on the functions, and divides the unprocessed job into the classified partial jobs (steps S104 and S105). The classification and the division are made in the same way as in the steps 622 and 623 described above.

The PC 6 transmits the data of the job (including the partials jobs after the division) to the storage device 5 and causes the storage device 5 to store the job data (step S105), and returns to the main routine.

<Operation of Each Image Processing Device>

Next, the job process operation performed by each of the MFPs 1, 2, . . . will be described.

Figure 21:
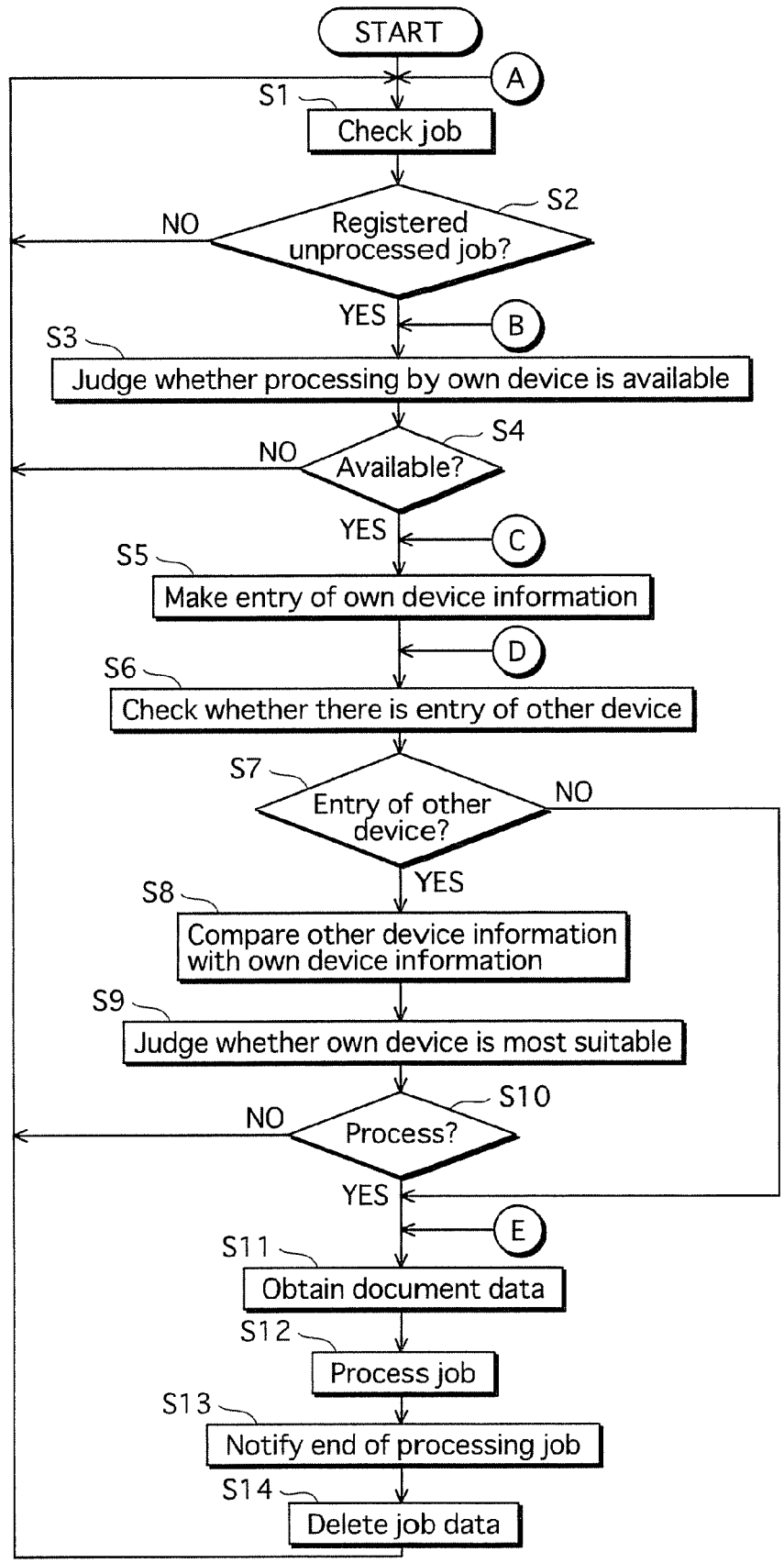
FIG. 21 is a flowchart of the process performed by each MFP.

FIG. 21 is a flowchart of the process performed by each MFP. The process is performed as the CPU 11 of the MFP executes a program stored in the flash memory 14 or the HDD 16. This applies to each of the flowcharts to be provided in the following.

As shown in FIG. 21, the MFP performs a job check at a predetermined cycle upon the storage device 5 to confirm whether or not an unprocessed job has been registered with the storage device 5 (step S1).

If it judges that an unprocessed job has been registered (YES in step S2), the MFP makes the first judgment on whether or not processing the registered job by the own device is available (step S3). On the other hand, if it judges that an unprocessed job has not been registered (NO in step S2), the MFP continues to perform the job check (step S1).

If it judges that processing the job by the own device is available (YES in step S4), the MFP makes an entry of the own device information (step S5), and judges whether or not there is an entry of another MFP (device) (step S6).

If it judges that there is an entry of another MFP (YES in step S7), the MFP obtains the entry file of the other MFP from the storage device 5, and compares the other device information with the own device information (step S8), and makes the second judgment on whether or not the own device is the most suitable device (step S9). If it judges that the own device is the most suitable device (YES in step S10), the MFP obtains (in the present example, downloads) the document data (step S11). Also, if it judges in step S7 that there is no entry of other MFPs (NO in step S7), the MFP downloads the document data (step S11). The MFP then processes the job (step S12) After completing the job, the MFP notifies the storage device 5 and the PC 6 of the end of the job (step S13). The MFP then deletes the job data from the storage device 5 (step S14), and returns to the job check (step S1).

If it judges that processing the job by the own device is not available (NO in step S4), or if it judges that the own device is not the most suitable device (NO in step S10), the MFP returns to step S1.

Figure 22:
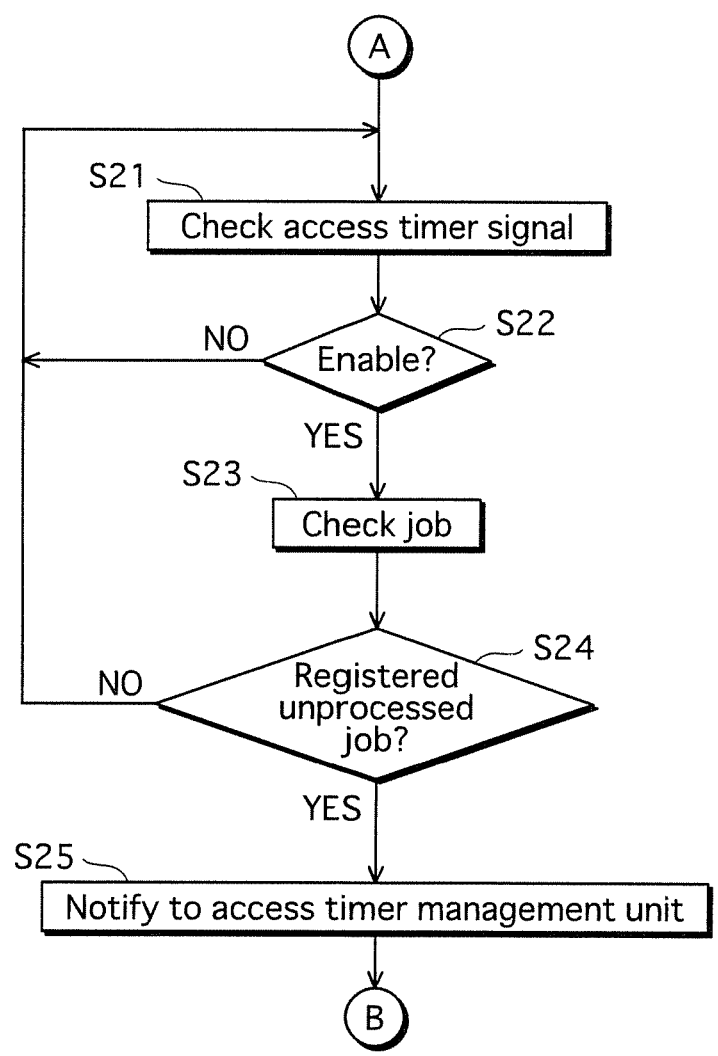
FIG. 22 is a flowchart showing details of a part of the process.

FIG. 22 is a flowchart showing details of the process between A and B in FIG. 21.

As shown in FIG. 22, the MFP checks the access timer signal (step S21). If the access timer signal is enable (YES in step S22), the MFP checks whether or not an unprocessed job has been registered with the storage device 5 (step S23).

If it judges that an unprocessed job has been registered (YES in step S24), the MFP notifies the access timer management unit 97 that an unprocessed job has been registered (step S25).

If it judges in step S22 that the access timer signal is not enable, or if it judges in step S24 that an unprocessed job has not been registered, the MFP returns to step S21.

Figure 23:
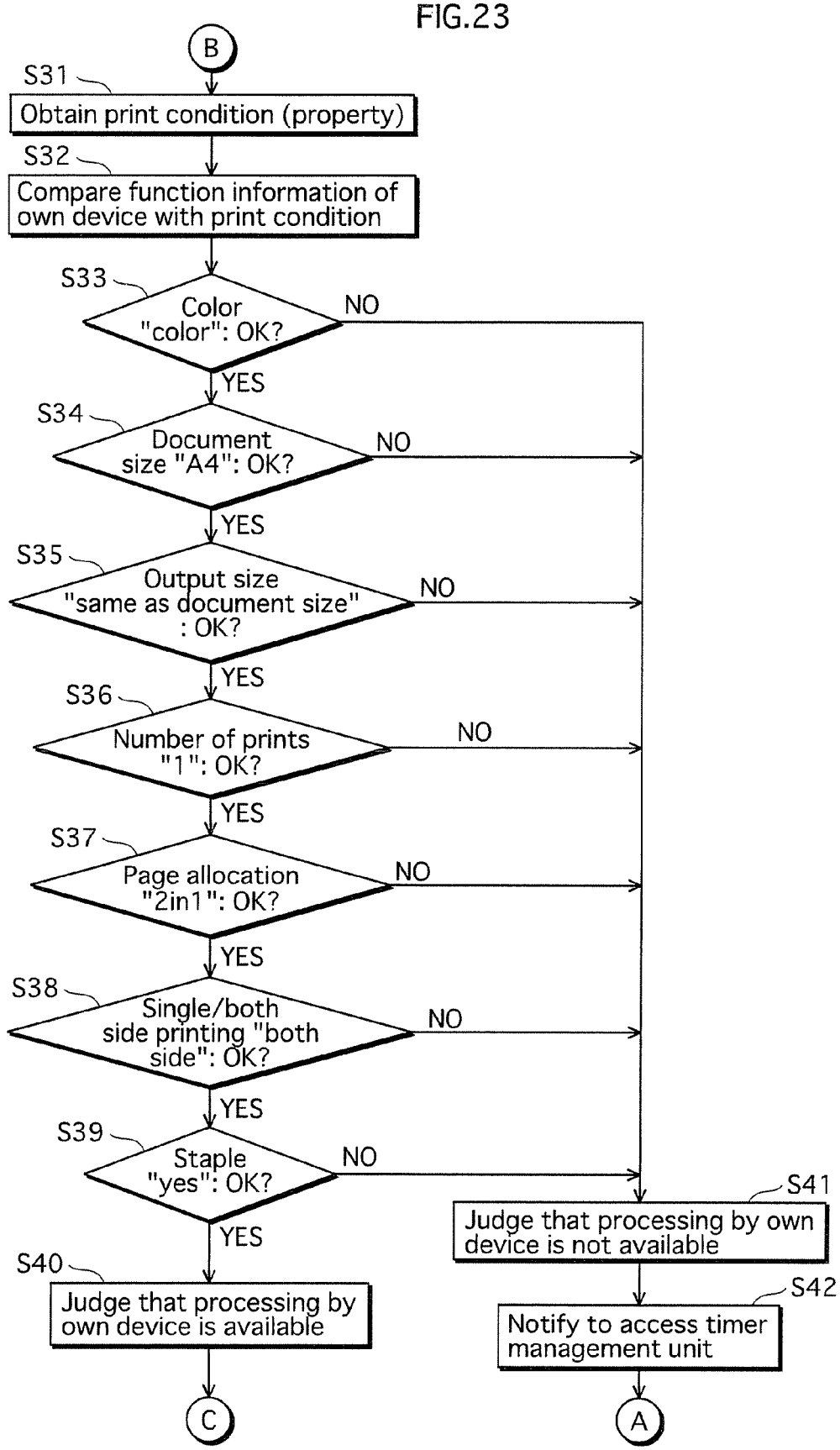
FIG. 23 is a flowchart showing details of another part of the process.

FIG. 23 is a flowchart showing details of the process between B and C in FIG. 21.

As shown in FIG. 23, the MFP obtains the job process condition, which is the print condition in the case of a print job (step S31), and compares the function information of the own device with the obtained print condition (step S32).

Then, in the succeeding steps, the MFP judges whether or not the own device satisfies the requested conditions, for each of the print condition items: color, document size, output size, the number of prints, page allocation, single/both side printing, and staple. Here, the judgment will be explained based on an example case where the print condition is set as follows: color is "color", document size is "A4", output size is "same as document size", the number of prints is "1", page allocation is "2in1", single/both side printing is "both side", and staple is "yes". First, if the own device has the color print function, the MFP judges that the own device satisfies the condition, namely, OK (YES in step S33), and moves to step S34. If the own device does not have the color print function, the MFP judges that the own device does not satisfy the condition (NO in step S33), and moves to step S41.

In step S34, the MFP judges whether or not the own device supports the document size of A4. If it judges that the own device supports the document size of A4 (YES in step S34), the MFP moves to step S35. On the other hand, if it judges that the own device does not support the document size of A4 (NO in step S34), the MFP moves to step S41.

Following this, the MFP judges in a similar manner whether or not the own device satisfies the condition, for each of the output size (step S35), the number of prints (step S36), page allocation (step S37), single/both side printing (step S38), and staple (step S39).

If it confirms that the own device satisfies the all conditions (YES in all of steps S33 to S39), the MFP judges that processing by the own device is available (step S40).

On the other hand, if it confirms that the own device does not satisfy at least one of the conditions, the MFP judges that processing by the own device is not available (step S41), and notifies the access timer management unit 97 that the MFP does not make en entry (step S42).

Figure 24:
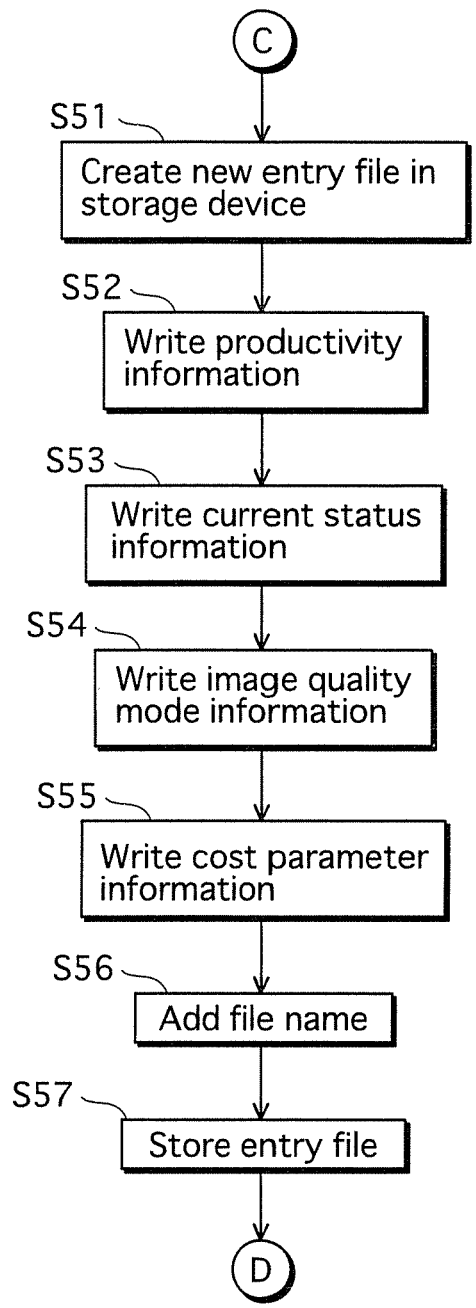
FIG. 24 is a flowchart showing details of further another part of the process.

FIG. 24 is a flowchart showing details of the process between C and D in FIG. 21.

As shown in FIG. 24, the MFP creates a new entry file in a folder corresponding to the job, in the storage device 5 (step S51), writes, into the entry file, the productivity information, current status information, image quality mode information, and cost parameter information (steps S52 to S55, respectively), adds the file name (step S56), and stores and registers the entry file (step S57). It should be noted here that the entry file may be created within the MFP and then stored in the storage device 5.

Figure 25:
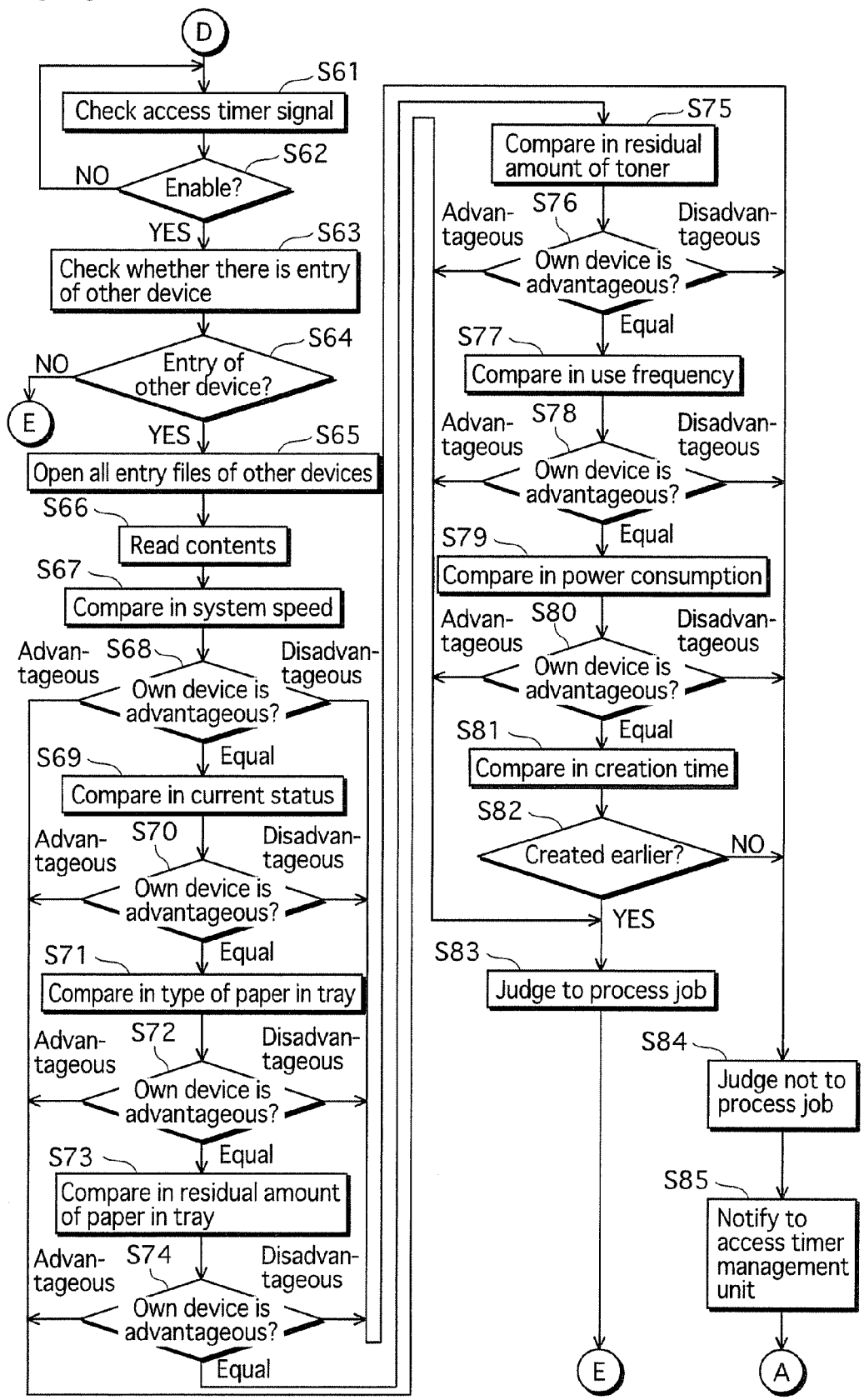
FIG. 25 is a flowchart showing details of further another part of the process.

FIG. 25 is a flowchart showing details of the process between D and E in FIG. 21.

As shown in FIG. 25, the MFP checks the access timer signal (step S61). If the access timer signal is enable (YES in step S62), the MFP checks whether or not there is an entry made by another MFP for the job (step S63). If the access timer signal is not enable (NO in step S62), the MFP returns to checking the access timer signal (step S61).

If it judges that there is an entry made by another MFP (YES in step S64), the MFP opens all entry files made by other MFPs (step S65), and reads the contents of the entry files (step S66).

Next, the MFP makes a comparison among the read-out contents of the entry files in the order of priority. For example, if there are entries made by the MFPs 1 and 3, and if the contents of the entry files are as shown in FIG. 16A, the MFP first makes a comparison with respect to the system speed that is the information having the highest priority (step S67).

In this comparison, the MFP judges whether the own device is advantageous, disadvantageous, or equal in comparison with the other devices. If it judges that the own device is advantageous (Advantageous in step S68), the MFP judges that the own device should process the job (step S83). If it judges that the own device is disadvantageous (Disadvantageous in step S68), the MFP judges that the own device should not process the job (step S84). If it judges that the own device is equal with the other devices (Equal in step S68), the MFP proceeds to make a comparison with respect to the current status that is the information having the next highest priority (step S69).

In the present example, entries are made by two MFPs. In the case where entries are made by three or more MFPs, only the most advantageous MFP judges that the own device is advantageous (Advantageous in step S68), and the other MFPs judge that the own devices are disadvantageous (Disadvantageous in step S68). If there are two or more most advantageous MFPs, they judge that the own devices are equal with each other (Equal in step S68), and the MFPs other than the two or more most advantageous MFPs judge that the own devices are disadvantageous (Disadvantageous in step S68).

If it judges in comparison in the current status that the own device is advantageous (Advantageous in step S70), the MFP judges that the own device should process the job (step S83). If it judges that the own device is disadvantageous (Disadvantageous in step S70), the MFP judges that the own device should not process the job (step S84). If it judges that the own device is equal with the other devices (Equal in step S70), the MFP proceeds to make a comparison with respect to the type of paper in tray (step S71).

If it judges in comparison in the type of paper in tray that the own device is advantageous (Advantageous in step S72), the MFP judges that the own device should process the job (step S83). If it judges that the own device is disadvantageous (Disadvantageous in step S72), the MFP judges that the own device should not process the job (step S84). If it judges that the own device is equal with the other devices (Equal in step S72), the MFP proceeds to make a comparison with respect to the residual amount of paper in tray (step S73).

If it judges in comparison in the residual amount of paper in tray that the own device is advantageous (Advantageous in step S74), the MFP judges that the own device should process the job (step S83). If it judges that the own device is disadvantageous (Disadvantageous in step S74), the MFP judges that the own device should not process the job (step S84). If it judges that the own device is equal with the other devices (Equal in step S74), the MFP proceeds to make a comparison with respect to the residual amount of toner (step S75).

If it judges in comparison in the residual amount of toner that the own device is advantageous (Advantageous in step S76), the MFP judges that the own device should process the job (step S83). If it judges that the own device is disadvantageous (Disadvantageous in step S76), the MFP judges that the own device should not process the job (step S84). If it judges that the own device is equal with the other devices (Equal in step S76), the MFP proceeds to make a comparison with respect to the use frequency (step S77).

If it judges in comparison in the use frequency that the own device is advantageous (Advantageous in step S78), the MFP judges that the own device should process the job (step S83). If it judges that the own device is disadvantageous (Disadvantageous in step S78), the MFP judges that the own device should not process the job (step S84). If it judges that the own device is equal with the other devices (Equal in step S78), the MFP proceeds to make a comparison with respect to the power consumption (step S79).

If it judges in comparison in the power consumption that the own device is advantageous (Advantageous in step S80), the MFP judges that the own device should process the job (step S83). If it judges that the own device is disadvantageous (Disadvantageous in step S80), the MFP judges that the own device should not process the job (step S84). If it judges that the own device is equal with the other devices (Equal in step S80), the MFP proceeds to make a comparison with respect to the entry file creation time (step S81).

If it judges that the entry file creation time of the own device is earlier (YES in step S82), the MFP judges that the own device should process the job (step S83). If it judges that the entry file creation time of the own device is later (NO in step S82), the MFP judges that the own device should not process the job (step S84). If the MFP judges in step S84 that the own device should not process the job, the MFP notifies the access timer management unit 97 of the judgment result (step S85).

Up to now, an example of the productivity oriented mode has been described. Also, for example, an operation in the cost oriented mode is available, in which a judgment on whether the own device is advantageous or not is made with respect to, for example, each item of the entry file shown in FIG. 16B, in the order from the highest priority to the lowest priority.

Figure 26:
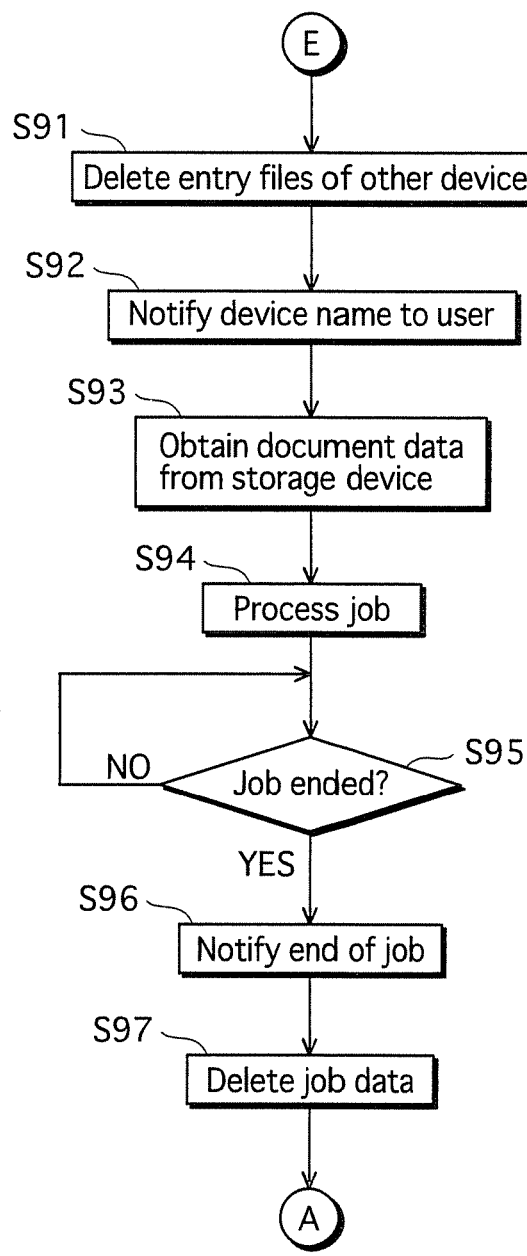
FIG. 26 is a flowchart showing details of further another part of the process.

FIG. 26 is a flowchart showing details of the process between E and A in FIG. 21.

As shown in FIG. 26, the MFP deletes the entry files of the other MFPs (step S91), notifies the device name of the own device to the user (step S92), obtains the document data from the storage device 5 (step S93), and processes the job (step S94).

After the job ends (YES in step S95), the MFP notifies the user of the end of the job (step S96), and deletes the job data from the storage device 5 (step S97).

As described above, the present embodiment reduces the cost since it eliminates the need for a server that is used in conventional technologies. Also, the present embodiment prevents a case where a failure occurs in the server and jobs cannot be processed at all.

According to the present embodiment, one job is divided into partial jobs. This enables a plurality of partial jobs to be distributed to and processed by a plurality of MFPs, achieving smooth processing of the jobs. Further, the number of MFPs that make entries of the own device information changes depending on the job process condition. For example, if a function, which is provided only by a small number of predetermined MFPs, is specified as the process condition, the number of MFPs that make entries of the own device information for the job is reduced, and the load applied to the network decreases. Further, information (entry files) is obtained only from MFPs that judged that the own device can process the job. This enables the information to be obtained in a relatively short time, preventing a case where selection of the most suitable MFP cannot be done appropriately due to a change of the MFP status during the time in which the information is obtained.

Further, according to the present embodiment, as shown in FIG. 8, the MFP 2, which judged that the own device cannot process a job (the first judgment), accesses the storage device 5 to judge whether the own device can process another job (the first judgment) while the other MFPs 1 and 3, having made entries, judge whether or not the own device should process the job (the second judgment). In this case, if, for example, the MFP 2 and an MFP 4 (not illustrated) make entries of the own device information for said another job, the MFPs 2 and 4 make the second judgment as the MFPs 1 and 3 do for the first job, and one of the MFPs 2 and 4 processes said another job.

Accordingly, in processing a plurality of jobs, it is possible to perform the above-described sequence of operations from (3) Checking Job to (16) Deleting Job Data, for each of the plurality of jobs concurrently in parallel. Compared with a structure where a sequence of operations for a job is completed first, and then a sequence of operations for another job is started, this structure reduces the time required by the system to process the jobs as a whole.

In the example described above, the PC 6 enters a job into the storage device 5. However, the structure is also applicable to a case where an MFP receives a request for processing a job directly from the user. That is to say, after one MFP receives a request for processing a job via an operation panel 80 of the own device, the MFP transmits the data of the requested job to the storage device 5, and the job is registered with the storage device 5. In this case also, if the job can be divided into partial jobs, a job dividing unit 101 of the MFP divides the job into partial jobs. Following this, the MFP makes the judgment on whether the own device can process the job, makes an entry of the own device information, and the like, as described above.

Embodiment 2

In Embodiment 1 described above, all the MFPs perform the job check at the same cycle. Embodiment 2 differs from Embodiment 1 in that the MFPs perform the job check not necessarily at the same cycle. In the following, to avoid redundancy, the description having already been provided in Embodiment 1 is omitted, and the same reference numbers are used for the constituent elements that are common with Embodiment 1.

Figure 27:
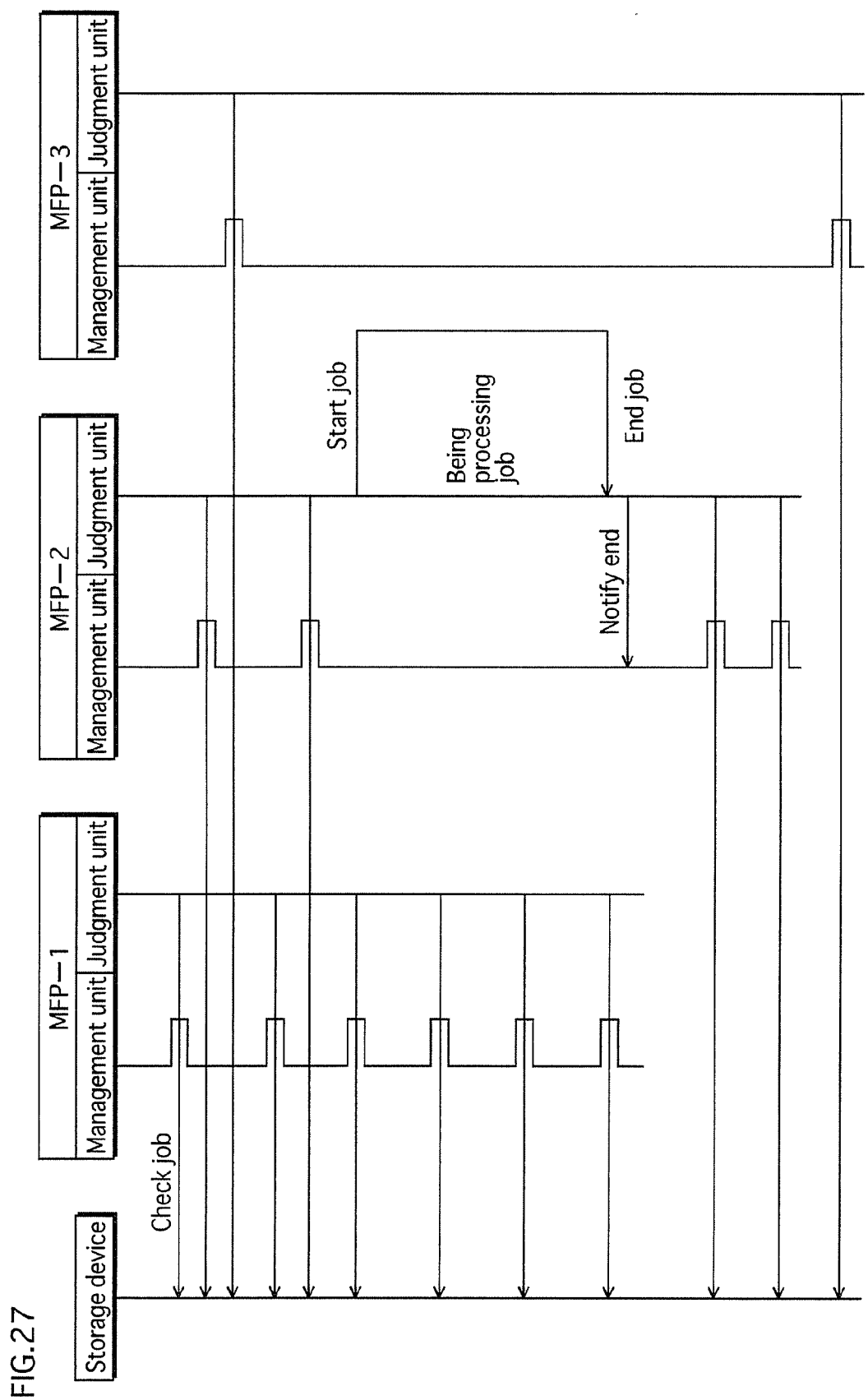
FIG. 27 is a sequence diagram showing a detailed operation of the image processing system in Embodiment 2.

FIG. 27 is a sequence diagram showing a detailed operation of the image processing system in Embodiment 2. It should be noted here that, in FIG. 27, the job judgment processing unit 96 and the access timer management unit 97 are respectively indicated in abbreviated forms "judgment unit" and "management unit".

The access timer management units 97 of each of the MFPs 1, 2, and 3 generate an access timing signal at a predetermined cycle. The job judgment processing unit 96 of each of the MFPs 1, 2, and 3 confirms at a predetermined cycle whether there is an unprocessed job that has been registered with the storage device 5. In the example shown in FIG. 27, the cycles at which the MFP 1 and the MFP 2 respectively perform the job checks are set to substantially the same value, but the cycle at which the MFP 3 performs the job check is set to a value that is greater than the value for the MFP 1 and the MFP 2.

For example, the cycle for the MFP 1 is set to T1, and the cycle for the MFP 3 is set to T2 (T2=T1×2). When the cycle is set to a greater value, the number of job checks per unit time becomes smaller, the number of entries becomes smaller, and the number of job receptions becomes smaller.

The reason for setting a longer cycle for a certain MFP is, for example, to reduce the jobs processed by the certain MFP because the certain MFP has a slower system speed than the other MFPs, or because the certain MFP is prioritized to receive FAX over the other MFPs. When a longer cycle is set for the certain MFP, the number of job checks performed by the certain MFP is reduced, and the probability that the certain MFP process a job decreases. This reduces, for example, the possibility that the job processing delays as a whole since an MFP with a slower system speed processes a job, and the possibility that an MFP dedicated to receiving FAX can hardly receive FAX. Adversely, when the cycle for an MFP is set to a smaller value than for the other MFPs, the number of job checks increases, and reduces the job wait time. This improves the productivity of print or the like. It should be noted here that, for example, the manager or the like may arbitrarily set the cycle from the PC, the operation panel, or the like.

In the image processing system of the present embodiment having the above-described structure, each MFP performs the job check at a cycle uniquely set for each MFP. This makes it possible to cause a desired MFP to process jobs more frequently than another MFP, by setting the cycle for the desired MFP to a smaller value and setting the cycle for the other MFP to a greater value.

Further, the image processing system of the present embodiment may have a structure in which each MFP automatically change the cycle of job check depending on the status of the own device. For example, each MFP may change the cycle from t1, which is an ordinary cycle, to t2, which is longer than t1, while an error such as a paper jam, paper empty, toner empty, or defect occurs. This is because, once such an error occurs, it often takes time for the device to restore the normal state. It is also possible to substantially prevent the job check by setting the cycle t2 to an extremely great value. It is further possible to adopt a structure where the job check itself is stopped.

Further, the cycle may be automatically changed depending on the status of the own device such as the system speed, residual amount of work memory (RAM), or job processing status, not limited to depending on the above-mentioned paper jam, defect and the like.

For example, when the MFP 2 is processing a job and cannot start processing another job immediately, it is not an efficient way to allocate a new job to the MFP 2. In such a case, the following can be done. That is to say, upon receiving a notification of a job process start from the main control unit 91 of the MFP overall control software 90, the access timer management unit 97 of the MFP 2 changes the cycle of the job check performed by the MFP to a greater value, as shown in FIG. 27. Then, upon receiving a job end notification from the job judgment processing unit 96 after the job is completed, the access timer management unit 97 returns the cycle of the job check to the former value.

With the above-described structure in which the cycle of the job check is changed depending on the status of the MFP, it is possible to cause a certain MFP to process a job by priority, by, for example, changing the cycle to a greater value when the certain MFP is in a status where it does not need to process the job, and changing the cycle to a smaller value when the certain MFP is in a status where it needs to process the job.

In the image processing system of the present embodiment, the cycle of the job check is set separately by each image processing device and the set cycle of the job check is changed depending on the status of the image processing device. However, not limited to this, the image processing system of the present embodiment may have such a structure where the cycle of the job check is not set separately by each image processing device and the set cycle of the job check is not changed, or the image processing system of the present embodiment may have such a structure where the cycle of the job check is set to substantially a same value in each MFP and the set cycle of the job check is changed depending on the status of the MFP.

Further, the image processing system of the present embodiment may have such a structure where each image processing device performs a job check, but may cancel making an entry immediately before making the entry, if a certain condition is met. Here, the certain condition is, for example, that the image processing device is currently processing a job and it is expected to take a long time before finishing the job, that the residual amount of paper or toner is small and it is expected to become empty during the job processing, or that the execution of a job becomes unavailable due to an error or the like that occurs after the job check. Not making an entry means that the own device information is not transmitted. This eliminates the need to confirm the capability or status of the own device, and thus reduce the load applied to the network.

Embodiment 3

The image processing system of Embodiment 3 differs from that of Embodiment 1 in that, if an image processing device judges in the second judgment that the own device is equal, neither advantageous nor disadvantageous, in comparison with the other devices, the image processing device adds a new piece of information for the judgment, and if the image processing device judges that the own device is advantageous in comparison with the other devices with respect to the newly added information, the image processing device processes the job.

FIGS. 28A and 28B show examples of entry files in the present embodiment. FIG. 28A shows entry files before information is newly added, and FIG. 28B shows entry files after information is newly added.

For example, if the entry files of the MFP 1 and MFP 3 are the same as shown in FIG. 28A, the job judgment processing units 96 of the MFP 1 and MFP 3 judge that the MFP 1 and MFP 3 are equal, and suspend the judgment on whether the own device should process the job. Then, information is newly added to the entry files stored in the storage device 5, as shown in FIG. 28B.

After the information is newly added to the entry files, each of the job judgment processing units 96 of the MFP 1 and MFP 3 obtains the entry files of the other MFPs again from the storage device 5, and resumes the judgment on whether the own device should process the job. That is to say, they do not make a judgment with respect to the information for which the judgment has already made, but make a judgment with respect to only the newly added information.

In the example shown in FIG. 28B, first a comparison is made with respect to the paper residual amount that has the highest priority among the added pieces of information, and the result is "equal" since both are set to "Full".

Then, a comparison is made with respect to the security setting that has the second highest priority among the added pieces of information, where the enhanced mode is on in the MFP 1 and is off in the MFP 3. As a result, the MFP 1 judges that the own device is advantageous, and the MFP 3 judges that the own device is disadvantageous.

The MFP 1, having judged that the own device is advantageous, judges that the own device should process the job, obtains the document data and processes the job.

As described above, when it is impossible to judge whether the own device is advantageous or disadvantageous in the first judgment, information is newly added, and a judgment is made using the newly added information. This structure makes it possible to process a job using a further suitable MFP.

Embodiment 4

The image processing system of Embodiment 4 differs from that of Embodiment 1 in that, if an image processing device judges in the second judgment that the own device is equal, neither advantageous nor disadvantageous, in comparison with the other devices, the image processing device receives, from the user, a specification of a device that should process the partial job, and if the user specifies the own device, the image processing device judges that the own device should process the partial job.

Figure 29:
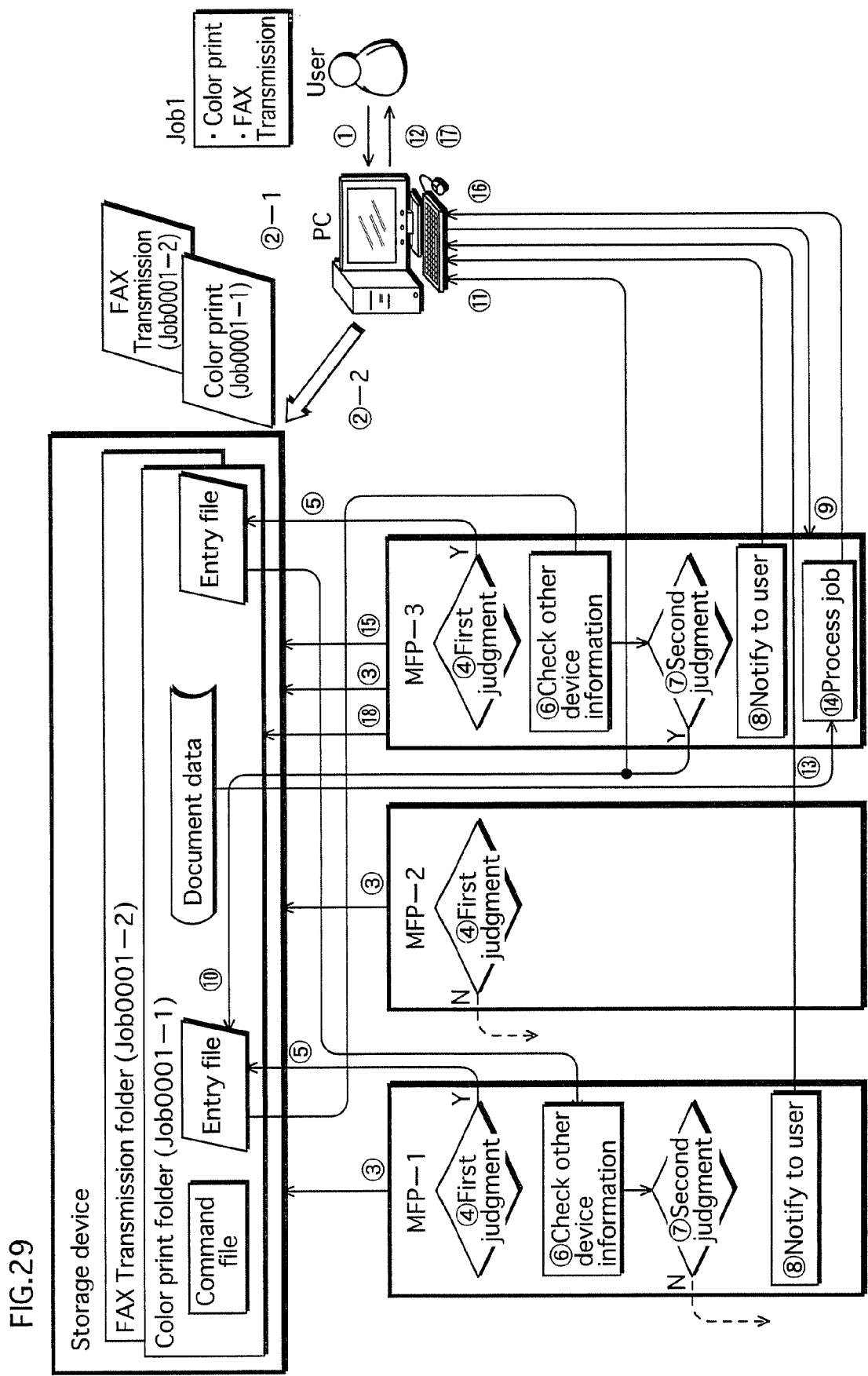
FIG. 29 schematically shows the operation of the image processing system in Embodiment 4.
Figure 30:
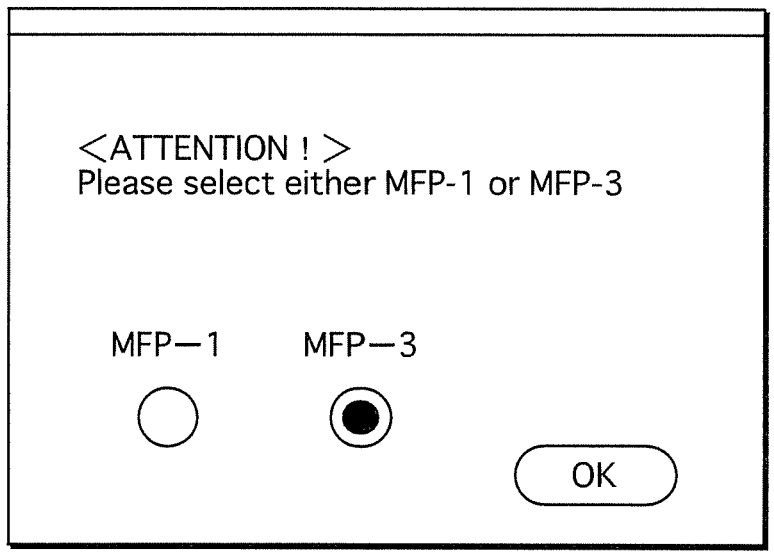
FIG. 30 shows an example of a display screen in the present embodiment.

FIG. 29 schematically shows the operation of the image processing system in the present embodiment. FIG. 30 shows a screen that is displayed when the judgment result is "equal", neither advantageous nor disadvantageous.

As shown in FIG. 29, (1) when a request for processing a job is received, (2) division, transmission, and registration of the job are performed. The IP address of the PC 6 being the transmission source is added to the job data. This addition of the IP address is automatically performed by the printer driver installed in the PC 6. This is followed by (3) the job check, (4) the first judgment, (5) making entry of the own device information, (6) checking the other device information, and (7) the second judgment.

If it is judged in the second judgment that, for example, the entry files for the MFP 1 and the MFP 3 are the same, the job judgment processing units 96 of the MFP 1 and the MFP 3 judge that the MFP 1 and MFP 3 are equal, neither advantageous nor disadvantageous, and suspend the judgment on whether the own device should process the job.

(8) Each of the MFP 1 and MFP 3 confirms the IP address attached to the job, identifies, from the IP address, the PC 6 as the job transmission source, and notifies the PC 6 that the most suitable MFP cannot be selected.

After the notification is received, displayed on the monitor 62 of the PC 6 is a message indicating that the most suitable MFP cannot be selected, and a message as shown in FIG. 30 urging the user to select one among the MFPs that made entries.

Seeing the message displayed on the monitor 62, the user can select a desired MFP using the mouse 64 or the like. For example, if the user selects the MFP 3 that is located near the user, (9) the printer driver of the PC 6 notifies the job judgment processing unit 96 of the MFP 3 of the selection. The job judgment processing unit 96 judges that the own device is advantageous, and judges that the own device should process the job.

Performed following this are: (10) deletion of the other device entry files, (11) notification of the device name to the PC, (12) notification of the device name to the user, (13) obtainment of the document data, (14) processing the job, (15) notification of the end of job to the storage device, (16) notification of the end of job to the PC, (17) notification of the end of job to the user, and (18) deletion of the job data.

The above-described structure, in which a selection of an MFP is received from the user, reflects the intention of the user, and is convenient for the user.

It should be noted here the present invention is not limited to an image processing device, such as the above-described MFP, or an image processing system, but may be a method for processing a job by performing the first and second judgments or the like described in the flowcharts. The present invention may be a program that causes a computer to perform the method. The program of the present invention may be recorded on any of various types of computer-readable recording mediums such as magnetic tape, magnetic disk such as flexible disk, optical recording medium such as DVD-ROM, DVD-RAM, CD-ROM, CD-R, MO, or PD, or flash memory type recording medium. The present invention may be manufactured or transferred in the form of such a recording medium, or may be transmitted or distributed in the form of a program via any of various types of wired or unwired networks including the Internet, broadcast, electronic communication line, or satellite communication.

Further, the program of the present invention may not necessarily include all the modules to cause a computer to execute the above-described processes. For example, it is possible to cause a computer to execute each process of the present invention by using any of various types of general-purpose programs, such as a communication program or a program contained in an operating system (OS), that can be installed separately in the information processing device. Accordingly, the above-described recording medium of the present invention may neither necessarily record therein nor transfer all the above-described modules. Further, a predetermined process among the above-described processes may be executed using dedicated hardware.

<Modifications>

Up to now, the present invention has been described based on its embodiments. However, the present invention is not limited to the embodiments, but may be modified, for example, as follows.

(1) In the above-described embodiments, the storage device 5 is an external storage device that is separate from the MFPs. However, the storage device 5 only needs to be included in the image processing system 8, and may be, for example, an internal storage device that is embedded in any of the MFPs. Further, not limited to a structure where the job data and the entry file are stored in the same storage device, the present invention may have a structure where the job data and the entry file are stored in different storage devices and these storage devices are used as a storage unit. Furthermore, the PC 6 is not indispensable to the image processing system 8. Accordingly, the image processing system 8 may not include the PC 6. In this case, a request for processing a job is made from any of the MFPs in the system.

(2) In the above-described embodiments, the capability information and the status information are written in the entry file, as the information used for selecting the most suitable MFP. However, information other than the capability information and the status information may be written in the entry file.

FIGS. 31A and 31B show examples of entry files in the present modification. As shown in FIGS. 31A and 31B, reception information, which indicates whether the own device has received a request for processing a job, is written in the entry file of each MFP so that it becomes apparent which MFP has received a request for processing a job. The reception information is compared among the MFPs, and the MFP that received a request for processing a job judges that the own device is advantageous.

(3) The job is not limited to a print job, but may be a copy job, scan job, FAX job or the like. In the case of the copy job, the capability information may include, for example, single/both side, Nin1, magnification rate, density adjustment, color adjustment, and finishing (punch, staple or the like). In the case of the scan job, the capability information may include, for example, single/both side, density adjustment, PDF/TIFF format change, scan to E-mail, and scan to HDD. In the case of the FAX job, the capability information may include, for example, single/both side, density adjustment, resolution change, and timer transmission.

(4) In the above-described embodiments, the MFP makes the first judgment based on the function information of the own device. However, not limited to this, the MFP may make the first judgment based on, for example, information (status information) that indicates the current job processing capability of the own device. The status information may be the same as the "current status" included in the entry file. In this case, the MFP judges that the own device can process the job if the own device is in wait, and judges that the own device cannot process the job if the own device is in warmup since it cannot start processing until the warmup ends. Further, the MFP may judge that the own device can process the job if a currently performed process is scheduled to end within a predetermined time period, and may judge that the own device cannot process the job if a currently performed process is scheduled to take time exceeding the predetermined time period. Furthermore, the MFP may judge that the own device cannot process the job if any of the following has occurred: paper jam, little amount of residual toner, toner empty, little amount of residual paper, paper empty, and failure. Furthermore, the MFP may judge whether the own device can process the job by referring to both the function information and status information.

(5) In the above-described embodiments, an example of a job, whose partial jobs process the same document data (process target data), is provided. However, the present invention is also applicable to a job that obtains the target data in the last after subjecting the process target data to different processes in sequence.

More specifically, a plurality of functional processes, such as a conversion process for converting the data file format, a magnification change process for reducing/magnifying the image after the conversion, a smoothing process for performing the smoothing function onto the image after the magnification change, and an output process for printing out the image after the smoothing, are performed as a plurality of partial jobs that are related with each other in one processing flow.

In this case, each MFP performs the first judgment, the second judgment and the like for each partial job, and each partial job is processed by an MFP that is judged as the most suitable MFP for the partial job. The process target data is read out from the storage device 5 to the MFP that processes the partial job, and is returned to the storage device 5 after the processing is completed. The reading and returning of the process target data is performed in the order of the process by the MFPs. These operations are repeated as necessary.

(6) In the above-described embodiments, a job is divided into partial jobs based on the functions. However, a job may be divided into partial jobs based on other factors than the functions. For example, the present invention is applicable to a structure where, if, for example, a job of printing 1000 sheets of paper is requested, the job is divided into partial jobs so that each partial job prints 100 sheets of paper, and a plurality of MFPs perform the partial jobs simultaneously in parallel.

(7) In the above-described embodiments, the job dividing unit is provided in both the PC and the MFP. However, the job dividing unit only needs to be included in the image processing system 8, and accordingly, not limited to this structure, the job dividing unit may be provided in either the PC or the MFP, for example. Also, the storage device 5 may be provided with a function that is similar to the function of the job dividing unit. With this structure, the PC or MFP enters a job into the storage device 5 without dividing the job, and the storage device 5 divides the job into partial jobs.

(8) In the above-described embodiments, the image processing device is an MFP. However, not limited to this, the image processing device may be, for example, a scanner, printer, copier, or facsimile device. Further, the number of image processing devices only needs to be two or more.

The present invention may be any combinations of the above-described embodiments and modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing system comprising:
   a storage;
   a plurality of image processing devices; and
   a job divider operable to divide an unprocessed job into a plurality of partial jobs that can be processed separately, and store the partial jobs into the storage, wherein each of the plurality of image processing devices includes:
a first judging part operable to judge whether one of the plurality of partial jobs stored in the storage can be processed by an own device by accessing the storage at a predetermine cycle;
a transmitter operable to, if the first judging part judges that the one of the plurality of partial jobs can be processed by the own device, transmit first information, which indicates a condition with respect to the own device's capabilities and/or status with which the own device processes the partial job, to the storage and cause the storage to store the first information;
an obtaining part operable to obtain from the storage second information, which indicates a condition with respect to capabilities and/or status with which another one of the plurality of image processing devices processes the partial job, stored to the storage by the another one image process device;
a second judging part operable to judge whether the own device should process the partial job, in accordance with a standard that is common to the plurality of image processing devices, by comparing the first information with the second information by accessing the storage, after the transmitter transmits the first information to the storage; and
a job processor operable to process the partial job if the second judging part judges that the own device should process the partial job; wherein
the second judging part deletes the second information that has been stored in the storage by other image processing devices among the plurality of image processing devices, to indicate to the other image processing devices that the own device is to process the partial job, and
when the first information stored in the storage can be processed by the own device, the second judging part performs the judgment on whether the own device should process the partial job, and when the first information transmitted by the own device, which is second information to the other image processing devices, has been deleted from the storage by any other image processing device among the plurality of image processing devices, the second judging part does not perform the judgment.

2. The image processing system of claim 1, wherein
data of the unprocessed job includes information indicating an image processing function as a process condition of the plurality of partial jobs, and
the first judging part makes the judgment by referring to (i) the information indicating the image processing function and (ii) information regarding an image processing function loaded in the own device.

3. The image processing system of claim 1, wherein
the first judging part makes the judgment in accordance with status information that indicates a current job processing capability of the own device.

4. The image processing system of claim 1, wherein
the predetermined cycle is changed depending on a status of the own device.

5. The image processing system of claim 4, wherein
the predetermined cycle is set to substantially a same value in the plurality of image processing devices.

6. The image processing system of claim 1, wherein
the cycle is set to a first value if a factor that prevents an execution of the partial job has not arisen, and the cycle is set to a second value, which is greater than the first value, if the factor has arisen.

7. The image processing system of claim 1, wherein
the standard common to the plurality of image processing devices is that an image processing device that is advantageous in comparison with other devices with respect to a condition, with which each image processing device processes the partial job, is selected from among the plurality of image processing devices, and
the second judging part judges that the own device should process the partial job if it is judged that the own device is advantageous in comparison with the other devices.

8. The image processing system of claim 1, wherein
the first information and the second information relate to job productivity, and
the second judging part judges that the own device should process the partial job if the own device has higher productivity than the other devices.

9. The image processing system of claim 1, wherein
the first information and the second information relate to job cost, and
the second judging part judges that the own device should process the partial job if the own device has a lower cost than the other devices.

10. The image processing system of claim 1, wherein
data of the unprocessed job includes (i) process target data that is subjected to processing of the job and (ii) process condition data that indicates process conditions of the plurality of partial jobs,
the job divider creates, for each partial job, a file containing the process target data and the process condition data, and
if the second judging part judges that the own device should process the partial job, the job processor processes the partial job using the process target data that corresponds to the partial job, and then deletes the process target data.

11. The image processing system of claim 1, wherein
data of the unprocessed job includes (i) process target data that is subjected to processing of the job and (ii) process condition data that indicates process conditions of the plurality of partial jobs,
the job divider creates, for each partial job, a file containing the process condition data, and
if the second judging part judges that the own device should process the partial job, the job processor processes the partial job using the process target data, and then deletes the process target data if the process target data is not used for other partial jobs.

12. The image processing system of claim 1, wherein
the first information and the second information are (a) capability information that indicates job processing capability of the own device and/or (b) status information that indicates a current status of the own device.

13. The image processing system of claim 1, wherein
the storage is (i) an external storage device that is different from the plurality of image processing devices or (ii) an internal storage device provided in any of the plurality of image processing devices.

14. The image processing system of claim 1, wherein
the job divider is provided in at least one of the plurality of image processing devices.

15. The image processing system of claim 1 further comprising
a terminal device operable to send a request for processing a job, wherein
the job divider is provided in the terminal device.

16. The image processing system of claim 1, wherein
the job divider is provided in the storage.

17. An image processing system comprising:
a storage;
a plurality of image processing devices; and
a job divider operable to divide an unprocessed job into a plurality of partial jobs that can be processed separately, and store the partial jobs into the storage, wherein
each of the plurality of image processing devices includes:
a first judging part operable to judge whether one of the plurality of partial jobs stored in the storage can be processed by an own device by accessing the storage at a predetermine cycle;
a transmitter operable to, if the first judging part judges that the one of the plurality of partial jobs can be processed by the own device, transmit first information, which indicates a condition with respect to the own device's capabilities and/or status with which the own device processes the partial job, to the storage and cause the storage to store the first information;
an obtaining part operable to obtain from the storage second information, which indicates a condition with respect to capabilities and/or status with which another one of the plurality of image processing devices processes the partial job, stored to the storage by the another one image process device;
a second judging part operable to judge whether the own device should process the partial job, in accordance with a standard that is common to the plurality of image processing devices, by comparing the first information with the second information by accessing the storage, after the transmitter transmits the first information to the storage; and
a job processor operable to process the partial job if the second judging part judges that the own device should process the partial job, wherein
the standard common to the plurality of image processing devices is that an image processing device that is advantageous in comparison with other devices with respect to a condition, with which each image processing device processes the partial job, is selected from among the plurality of image processing devices,
the second judging part judges that the own device should process the partial job if it is judged that the own device is advantageous in comparison with the other devices, and
if the second judging part judges that the own device is equal, neither advantageous nor disadvantageous, in comparison with the other devices, the second judging part receives, from a user, a specification of a device that should process the partial job, and if the user specifies the own device, the second judging part judges that the own device should process the partial job.

18. An image processing system comprising:
a storage;
a plurality of image processing devices; and
a job divider operable to divide an unprocessed job into a plurality of partial jobs that can be processed separately, and store the partial jobs into the storage, wherein
each of the plurality of image processing devices includes:
a first judging part operable to judge whether one of the plurality of partial jobs stored in the storage can be processed by an own device by accessing the storage at a predetermine cycle;
a transmitter operable to, if the first judging part judges that the one of the plurality of partial jobs can be processed by the own device, transmit first information, which indicates a condition with respect to the own device's capabilities and/or status with which the own device processes the partial job, to the storage and cause the storage to store the first information;
an obtaining part operable to obtain from the storage second information, which indicates a condition with respect to capabilities and/or status with which another one of the plurality of image processing devices processes the partial job, stored to the storage by the another one image process device;
a second judging part operable to judge whether the own device should process the partial job, in accordance with a standard that is common to the plurality of image processing devices, by comparing the first information with the second information by accessing the storage, after the transmitter transmits the first information to the storage; and
a job processor operable to process the partial job if the second judging part judges that the own device should process the partial job, wherein
the standard common to the plurality of image processing devices is that an image processing device that is advantageous in comparison with other devices with respect to a condition, with which each image processing device processes the partial job, is selected from among the plurality of image processing devices,
the second judging part judges that the own device should process the partial job if it is judged that the own device is advantageous in comparison with the other devices, and
if the second judging part judges that the own device is equal, neither advantageous nor disadvantageous, in comparison with the other devices, the transmitter transmits another first information, which indicates another condition with which the own device processes the partial job, to the storage and causes the storage to store the another first information,
the obtaining part obtains another second information, which indicates another condition with which the another image processing device processes the partial job, from the storage, and
the second judging part judges whether the own device should process the partial job, by referring to the another first information and the another second information.

19. An image processing device for use as one of a plurality of image processing devices included in an image processing system that further includes a storage, the image processing device comprising:
a first judging part operable to, if an unprocessed job has been divided into a plurality of partial jobs that can be processed separately, and the partial jobs are stored in the storage, judge whether one of the plurality of partial jobs stored in the storage can be processed by an own device by accessing the storage at a predetermined cycle;
a transmitter operable to, if the first judging part judges that the one of the plurality of partial jobs can be processed by the own device, transmit first information, which indicates a condition with respect to the own device's capabilities and/or status with which the own device processes the partial job, to the storage and cause the storage to store the first information;
an obtaining part operable to obtain from the storage second information, which indicates a condition with respect to capabilities and/or status with which another one of the plurality of image processing devices processes the partial job, stored to the storage by the another one image process device;

a second judging part operable to judge whether the own device should process the partial job, in accordance with a standard that is common to the plurality of image processing devices, by comparing the first information with the second information by accessing the storage, after the transmitter transmits the first information to the storage; and a job processor operable to process the partial job if the second judging part judges that the own device should process the partial job; wherein the second judging part deletes the second information that has been stored in the storage by other image processing devices among the plurality of image processing devices, to indicate to the other image processing devices that the own device is to process the partial job, and when the first information is stored in the storage can be processed by the own device, the second judging part performs the judgment on whether the own device should process the partial job, and when the first information transmitted by the own device, which is second information to the other image processing devices, has been deleted from the storage by any other image processing device among the plurality of image processing devices, the second judging part does not perform the judgment.

20. The image processing device of claim 19 further comprising:
a receiver operable to receive, from a user, a request for processing a job; and
a divider operable to, if the job specified by the request received by the receiver is an unprocessed job that can be divided into a plurality of partial jobs that can be processed separately, divide the unprocessed job into the partial jobs and store the partial jobs into the storage.

21. An image processing method for use in an image processing system that includes a storage and a plurality of image processing devices, the image processing method executing
a first step of dividing an unprocessed job into a plurality of partial jobs that can be processed separately and storing the partial jobs into the storage, wherein
after the execution of the first step, each of the plurality of image processing devices executes:
a second step of judging whether one of the plurality of partial jobs stored in the storage can be processed by an own device by accessing the storage at a predetermined cycle;
a third step of, if the second step judges that the one of the plurality of partial jobs can be processed by the own device, transmitting first information, which indicates a condition with respect to the own device's capabilities and/or status with which the own device processes the partial job, to the storage and causing the storage to store the first information;
a fourth step of obtaining from the storage second information, which indicates a condition with respect to capabilities and/or status with which another one of the plurality of image processing devices processes the partial job, stored to the storage by the another one image process device;
a fifth step of judging whether the own device should process the partial job, in accordance with a standard that is common to the plurality of image processing devices, by comparing the first information with the second information by accessing the storage, after the transmitter transmits the first information to the storage;

a six step of processing the partial job if the fifth step judges that the own device should process the partial job; and
a seventh step of deleting the second information that has been stored in the storage by other image processing devices among the plurality of image processing devices, to indicate to the other image processing devices that the own device is to process the partial job, and the fifth step of judging whether the own device should process the partial job is performed when the first information stored in the storage can be processed by the own device, and the fifth step is not performed when the first information transmitted by the own device, which is second information to the other image processing devices, has been deleted from the storage by any other image processing device among the plurality of image processing devices.

22. A non-transitory recording medium recording therein a program for causing a computer, which is included in one of a plurality of image processing devices constituting an image processing system that includes a storage as well, to execute:
a first process of judging whether one of the plurality of partial jobs stored in the storage can be processed by an own device by accessing the storage at a predetermined cycle;
a second process of, if the first process judges that the one of the plurality of partial jobs can be processed by the own device, transmitting first information, which indicates a condition with respect to the own device's capabilities and/or status with which the own device processes the partial job, to the storage and causing the storage to store the first information;
a third process of obtaining from the storage second information, which indicates a condition with respect to capabilities and/or status with which another one of the plurality of image processing devices processes the partial job, stored to the storage by the another one image process device;
a fourth process of judging whether the own device should process the partial job, in accordance with a standard that is common to the plurality of image processing devices, by comparing the first information with the second information by accessing the storage, after transmitting the first information to the storage;
a fifth process of processing the partial job if the fourth process judges that the own device should process the partial job; and
a sixth process of deleting the second information that has been stored in the storage by other image processing devices among the plurality of image processing devices, to indicate to the other image processing devices that the own device is to process the partial job, and the fourth process of judging whether the own device should process the partial job is performed when the first information stored in the storage can be processed by the own device, and the fourth process is not performed when the first information transmitted by the own device, which is second information to the other image processing devices, has been deleted from the storage by any other image processing device among the plurality of image processing devices.

23. The non-transitory recording medium of claim 22, wherein
the program further causes the computer to execute:
a receiving process of receiving, from a user, a request for processing a job; and a dividing process of, if the job specified by the request received in the receiving process is an unprocessed job that can be divided into a plurality of partial jobs that can be processed separately, dividing the unprocessed job into the partial jobs and storing the partial jobs into the storage.

24. An image processing device for use as one of a plurality of image processing devices included in an image processing system that further includes a storage, the image processing device comprising:
   a first judging part operable to, if an unprocessed job has been divided into a plurality of partial jobs that can be processed separately, and the partial jobs are stored in the storage, judge whether one of the plurality of partial jobs stored in the storage can be processed by an own device by accessing the storage at a predetermined cycle;
   a transmitter operable to, if the first judging part judges that the one of the plurality of partial jobs can be processed by the own device, transmit first information, which indicates a condition with respect to the own device's capabilities and/or status with which the own device processes the partial job, to the storage and cause the storage to store the first information;
   an obtaining part operable to obtain from the storage second information, which indicates a condition with respect to capabilities and/or status with which another one of the plurality of image processing devices processes the partial job, stored to the storage by the another one image process device;
   a second judging part operable to judge whether the own device should process the partial job, in accordance with a standard that is common to the plurality of image processing devices, by comparing the first information with the second information by accessing the storage, after the transmitter transmits the first information to the storage; and
   a job processor operable to process the partial job if the second judging part judges that the own device should process the partial job, wherein
   the standard common to the plurality of image processing devices is that an image processing device that is advantageous in comparison with other devices with respect to a condition, with which each image processing device processes the partial job, is selected from among the plurality of image processing devices,
   the second judging part judges that the own device should process the partial job if it is judged that the own device is advantageous in comparison with the other devices, and
   if the second judging part judges that the own device is equal, neither advantageous nor disadvantageous, in comparison with the other devices, the second judging part receives, from a user, a specification of a device that should process the partial job, and if the user specifies the own device, the second judging part judges that the own device should process the partial job.

25. An image processing device for use as one of a plurality of image processing devices included in an image processing system that further includes a storage, the image processing device comprising:
   a first judging part operable to, if an unprocessed job has been divided into a plurality of partial jobs that can be processed separately, and the partial jobs are stored in the storage, judge whether one of the plurality of partial jobs stored in the storage can be processed by an own device by accessing the storage at a predetermined cycle;
   a transmitter operable to, if the first judging part judges that the one of the plurality of partial jobs can be processed by the own device, transmit first information, which indicates a condition with respect to the own device's capabilities and/or status with which the own device processes the partial job, to the storage and cause the storage to store the first information;
   an obtaining part operable to obtain from the storage second information, which indicates a condition with respect to capabilities and/or status with which another one of the plurality of image processing devices processes the partial job, stored to the storage by the another one image process device;
   a second judging part operable to judge whether the own device should process the partial job, in accordance with a standard that is common to the plurality of image processing devices, by comparing the first information with the second information by accessing the storage, after the transmitter transmits the first information to the storage; and
   a job processor operable to process the partial job if the second judging part judges that the own device should process the partial job, wherein
   the standard common to the plurality of image processing devices is that an image processing device that is advantageous in comparison with other devices with respect to a condition, with which each image processing device processes the partial job, is selected from among the plurality of image processing devices,
   the second judging part judges that the own device should process the partial job if it is judged that the own device is advantageous in comparison with the other devices, and
   if the second judging part judges that the own device is equal, neither advantageous nor disadvantageous, in comparison with the other devices, the transmitter transmits another first information, which indicates another condition with which the own device processes the partial job, to the storage and causes the storage to store the another first information,
   the obtaining part obtains another second information, which indicates another condition with which the another image processing device processes the partial job, from the storage, and
   the second judging part judges whether the own device should process the partial job, by referring to the another first information and the another second information.

26. A non-transitory recording medium recording therein a program for causing a computer, which is included in one of a plurality of image processing devices constituting an image processing system that includes a storage as well, to execute:
   a first process of judging whether one of the plurality of partial jobs stored in the storage can be processed by an own device by accessing the storage at a predetermined cycle;
   a second process of, if the first process judges that the one of the plurality of partial jobs can be processed by the own device, transmitting first information, which indicates a condition with respect to the own device's capabilities and/or status with which the own device processes the partial job, to the storage and causing the storage to store the first information;
   a third process of obtaining from the storage second information, which indicates a condition with respect to capabilities and/or status with which another one of the plurality of image processing devices processes the partial job, stored to the storage by the another one image process device;

a fourth process of judging whether the own device should process the partial job, in accordance with a standard that is common to the plurality of image processing devices, by comparing the first information with the second information by accessing the storage, after transmitting the first information to the storage;

a fifth process of processing the partial job if the fourth process judges that the own device should process the partial job, wherein the standard common to the plurality of image processing devices is that an image processing device that is advantageous in comparison with other devices with respect to a condition, with which each image processing device processes the partial job, is selected from among the plurality of image processing devices, the fourth process includes judging that the own device should process the partial job if it is judged that the own device is advantageous in comparison with the other devices, and if the fourth process judges that the own device is equal, neither advantageous nor disadvantageous, in comparison with the other devices, the fourth process includes receiving, from a user, a specification of a device that should process the partial job, and if the user specifies the own device, the fourth process judges that the own device should process the partial job.

27. A non-transitory recording medium recording therein a program for causing a computer, which is included in one of a plurality of image processing devices constituting an image processing system that includes a storage as well, to execute:

a first process of judging whether one of the plurality of partial jobs stored in the storage can be processed by an own device by accessing the storage at a predetermined cycle;

a second process of, if the first process judges that the one of the plurality of partial jobs can be processed by the own device, transmitting first information, which indicates a condition with respect to the own device's capabilities and/or status with which the own device processes the partial job, to the storage and causing the storage to store the first information;

a third process of obtaining from the storage second information, which indicates a condition with respect to capabilities and/or status with which another one of the plurality of image processing devices processes the partial job, stored to the storage by the another one image process device;

a fourth process of judging whether the own device should process the partial job, in accordance with a standard that is common to the plurality of image processing devices, by comparing the first information with the second information by accessing the storage, after transmitting the first information to the storage;

a fifth process of processing the partial job if the fourth process judges that the own device should process the partial job, wherein the standard common to the plurality of image processing devices is that an image processing device that is advantageous in comparison with other devices with respect to a condition, with which each image processing device processes the partial job, is selected from among the plurality of image processing devices, the fourth process includes judging that the own device should process the partial job if it is judged that the own device is advantageous in comparison with the other devices, and if the fourth process judges that the own device is equal, neither advantageous nor disadvantageous, in comparison with the other devices, the second process includes transmitting another first information, which indicates another condition with which the own device processes the partial job, to the storage and causes the storage to store the another first information, the third process includes obtaining another second information, which indicates another condition with which the another image processing device processes the partial job, from the storage, and the fourth process judges whether the own device should process the partial job, by referring to the another first information and the another second information.

* * * * *